United States Patent
Fike et al.

(10) Patent No.: US 7,355,966 B2
(45) Date of Patent: Apr. 8, 2008

(54) METHOD AND SYSTEM FOR MINIMIZING DISRUPTION IN COMMON-ACCESS NETWORKS

(75) Inventors: John M Fike, Austin, TX (US); William J. Wen, Austin, TX (US); Patricia E Hareski, Austin, TX (US); Steven Robalino, Austin, TX (US)

(73) Assignee: QLOGIC, Corporation, Aliso Viejo, CA (US)

( * ) Notice: Subject to any disclaimer, the term of this patent is extended or adjusted under 35 U.S.C. 154(b) by 724 days.

(21) Appl. No.: 10/889,337

(22) Filed: Jul. 12, 2004

(65) Prior Publication Data

US 2005/0013609 A1    Jan. 20, 2005

Related U.S. Application Data

(60) Provisional application No. 60/492,346, filed on Aug. 4, 2003, provisional application No. 60/490,747, filed on Jul. 29, 2003, provisional application No. 60/487,876, filed on Jul. 16, 2003, provisional application No. 60/487,887, filed on Jul. 16, 2003, provisional application No. 60/487,875, filed on Jul. 16, 2003, provisional application No. 60/487,667, filed on Jul. 16, 2003, provisional application No. 60/487,665, filed on Jul. 16, 2003, provisional application No. 60/487,873, filed on Jul. 16, 2003.

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04L 12/28 | (2006.01) |

(52) U.S. Cl. .............. 370/217; 370/242; 370/244; 370/245; 370/249; 370/254

(58) Field of Classification Search ............... 370/222, 370/217, 242, 244, 245, 254
See application file for complete search history.

(56) References Cited

U.S. PATENT DOCUMENTS 4,162,375 A     7/1979   Schilichte ................. 179/15

(Continued)

FOREIGN PATENT DOCUMENTS

EP          0649098          9/1994

(Continued)

OTHER PUBLICATIONS

Clark, Tom, "Zoning for Fibre Channel Fabrics", Vixel Corporation Paper—XP002185194., (Aug. 1999), pp. 1-6.

(Continued)

*Primary Examiner*—Seema S. Rao
*Assistant Examiner*—Xavier Szewai Wong
(74) *Attorney, Agent, or Firm*—Klein, O'Neill & Singh, LLP; TJ Singh

(57) ABSTRACT

A method and fibre channel switch element is provided for isolating a defective device that is coupled to a fibre channel arbitrated loop. The method includes, isolating a port if a loop initialization primitive ("LIP") is detected from a device coupled to the arbitrated loop; configuring the device and acquiring an AL_PA; determining if the device is sending LIPs; and isolating the device if the device continues to send LIPs. The switch element includes, a port having an isolation state machine that allows the switch element to isolate a device whose behavior may result in disruption of other devices in the network. The state machine may also configure a device after detecting disruptive parameters from the device and perform diagnostic operations on the device.

13 Claims, 16 Drawing Sheets

U.S. PATENT DOCUMENTS

| | | | |
|---|---|---|---|
| 4,200,929 A | 4/1980 | Davidjuk et al. | |
| 4,382,159 A | 5/1983 | Bowditch | |
| 4,425,640 A | 1/1984 | Philip et al. | 370/58 |
| 4,546,468 A | 10/1985 | Christmas et al. | 370/54 |
| 4,569,043 A | 2/1986 | Simmons et al. | 370/63 |
| 4,725,835 A | 2/1988 | Schreiner et al. | 340/825.83 |
| 4,821,034 A | 4/1989 | Anderson et al. | 340/825 |
| 4,980,857 A | 12/1990 | Walter et al. | |
| 5,051,742 A | 9/1991 | Hullett et al. | |
| 5,115,430 A | 5/1992 | Hahne et al. | |
| 5,144,622 A | 9/1992 | Takiyasu et al. | 370/85.13 |
| 5,260,933 A | 11/1993 | Rouse | |
| 5,367,520 A | 11/1994 | Cordell | 370/60 |
| 5,590,125 A | 12/1996 | Acampora et al. | |
| 5,598,541 A | 1/1997 | Malladi | 395/286 |
| 5,610,745 A | 3/1997 | Bennett | 359/139 |
| 5,623,492 A | 4/1997 | Teraslinna | |
| 5,666,483 A | 9/1997 | McClary | |
| 5,687,172 A | 11/1997 | Cloonan et al. | 370/395 |
| 5,701,416 A | 12/1997 | Thorson et al. | |
| 5,706,279 A | 1/1998 | Teraslinna | |
| 5,748,612 A | 5/1998 | Stoevhase et al. | 370/230 |
| 5,812,525 A | 9/1998 | Teraslinna | |
| 5,818,842 A | 10/1998 | Burwell et al. | 370/397 |
| 5,821,875 A | 10/1998 | Lee et al. | |
| 5,825,748 A | 10/1998 | Barkey et al. | |
| 5,828,475 A | 10/1998 | Bennett et al. | |
| 5,835,752 A | 11/1998 | Chiang et al. | |
| 5,850,386 A | 12/1998 | Anderson et al. | |
| 5,894,560 A | 4/1999 | Carmichael et al. | |
| 5,954,796 A | 9/1999 | McCarty et al. | |
| 5,978,359 A | 11/1999 | Caldara et al. | |
| 5,987,028 A | 11/1999 | Yang et al. | 370/380 |
| 5,999,528 A | 12/1999 | Chow et al. | 370/365 |
| 6,014,383 A | 1/2000 | McCarty | 370/453 |
| 6,021,128 A | 2/2000 | Hosoya et al. | 370/380 |
| 6,026,092 A | 2/2000 | Abu-Amara et al. | |
| 6,031,842 A | 2/2000 | Trevitt et al. | |
| 6,047,323 A | 4/2000 | Krause | 709/227 |
| 6,055,618 A | 4/2000 | Thorson | |
| 6,061,360 A | 5/2000 | Miller et al. | |
| 6,081,512 A | 6/2000 | Muller et al. | 370/256 |
| 6,108,738 A | 8/2000 | Chambers et al. | |
| 6,108,778 A | 8/2000 | LaBerge | |
| 6,118,776 A | 9/2000 | Berman | |
| 6,128,292 A | 10/2000 | Kim et al. | 370/356 |
| 6,144,668 A | 11/2000 | Bass et al. | |
| 6,160,813 A | 12/2000 | Banks et al. | 370/422 |
| 6,201,787 B1 * | 3/2001 | Baldwin et al. | 370/222 |
| 6,229,822 B1 | 5/2001 | Chow et al. | |
| 6,240,096 B1 | 5/2001 | Book | |
| 6,253,267 B1 | 6/2001 | Kim et al. | |
| 6,289,002 B1 * | 9/2001 | Henson et al. | 370/222 |
| 6,308,220 B1 | 10/2001 | Mathur | 709/238 |
| 6,324,181 B1 | 11/2001 | Wong et al. | 370/403 |
| 6,330,236 B1 | 12/2001 | Ofek et al. | 370/369 |
| 6,343,324 B1 | 1/2002 | Hubis et al. | |
| 6,353,612 B1 | 3/2002 | Zhu et al. | |
| 6,370,605 B1 | 4/2002 | Chong | |
| 6,401,128 B1 | 6/2002 | Stai et al. | |
| 6,411,599 B1 | 6/2002 | Blanc et al. | 370/219 |
| 6,411,627 B1 | 6/2002 | Hullett et al. | |
| 6,418,477 B1 | 7/2002 | Verma | |
| 6,421,711 B1 | 7/2002 | Blumenau et al. | |
| 6,424,658 B1 | 7/2002 | Mathur | 370/429 |
| 6,449,274 B1 | 9/2002 | Holden et al. | 370/392 |
| 6,452,915 B1 | 9/2002 | Jorgensen | |
| 6,457,090 B1 | 9/2002 | Young | |
| 6,467,008 B1 | 10/2002 | Gentry, Jr. et al. | 710/261 |
| 6,470,026 B1 | 10/2002 | Pearson et al. | |
| 6,532,212 B1 | 3/2003 | Soloway et al. | |
| 6,570,850 B1 | 5/2003 | Gutierrez et al. | |
| 6,570,853 B1 | 5/2003 | Johnson et al. | |
| 6,594,231 B1 | 7/2003 | Byham et al. | |
| 6,597,691 B1 | 7/2003 | Anderson et al. | 370/360 |
| 6,597,777 B1 | 7/2003 | Ho | |
| 6,614,796 B1 | 9/2003 | Black et al. | |
| 6,697,359 B1 | 2/2004 | George | 370/357 |
| 6,697,368 B2 | 2/2004 | Chang et al. | |
| 6,718,497 B1 | 4/2004 | Whitby-Strevens | |
| 6,744,772 B1 | 6/2004 | Eneboe et al. | |
| 6,760,302 B1 | 7/2004 | Ellinas et al. | |
| 6,785,241 B1 | 8/2004 | Lu et al. | |
| 6,807,181 B1 | 10/2004 | Weschler | |
| 6,816,750 B1 | 11/2004 | Klaas | |
| 6,859,435 B1 | 2/2005 | Lee et al. | |
| 6,865,157 B1 | 3/2005 | Scott et al. | |
| 6,886,141 B1 | 4/2005 | Kunz et al. | |
| 6,941,357 B2 | 9/2005 | Nguyen et al. | |
| 6,941,482 B2 | 9/2005 | Strong | |
| 6,952,659 B2 | 10/2005 | King et al. | |
| 6,968,463 B2 | 11/2005 | Pherson et al. | |
| 7,000,025 B1 | 2/2006 | Wilson | |
| 7,002,926 B1 | 2/2006 | Eneboe et al. | |
| 7,010,607 B1 | 3/2006 | Bunton | |
| 7,039,070 B2 | 5/2006 | Kawakatsu | |
| 7,039,870 B2 | 5/2006 | Takaoka et al. | |
| 7,047,326 B1 | 5/2006 | Crosbie et al. | |
| 7,050,392 B2 | 5/2006 | Valdevit | |
| 7,055,068 B2 * | 5/2006 | Riedl | 714/43 |
| 7,061,871 B2 | 6/2006 | Sheldon et al. | |
| 7,092,374 B1 | 8/2006 | Gubbi | |
| 7,110,394 B1 | 9/2006 | Chamdani et al. | |
| 7,124,169 B2 | 10/2006 | Shimozono et al. | |
| 7,151,778 B2 | 12/2006 | Zhu et al. | |
| 7,171,050 B2 | 1/2007 | Kim | |
| 7,185,062 B2 | 2/2007 | Lolayekar et al. | |
| 7,188,364 B2 | 3/2007 | Volpano | |
| 7,190,667 B2 | 3/2007 | Susnow et al. | |
| 7,194,538 B1 | 3/2007 | Rabe et al. | |
| 7,200,108 B2 * | 4/2007 | Beer et al. | 370/222 |
| 7,215,680 B2 | 5/2007 | Mullendore et al. | |
| 7,221,650 B1 | 5/2007 | Cooper et al. | |
| 7,245,613 B1 | 7/2007 | Winkles et al. | |
| 7,248,580 B2 | 7/2007 | George et al. | |
| 7,269,131 B2 | 9/2007 | Cashman et al. | |
| 7,292,593 B1 | 11/2007 | Winkles et al. | |
| 2001/0011357 A1 | 8/2001 | Mori | |
| 2001/0038628 A1 | 11/2001 | Ofek et al. | 370/392 |
| 2001/0047460 A1 | 11/2001 | Kobayashi et al. | |
| 2002/0034178 A1 | 3/2002 | Schmidt et al. | |
| 2002/0071387 A1 | 6/2002 | Horiguchi et al. | |
| 2002/0103913 A1 | 8/2002 | Tawil et al. | |
| 2002/0104039 A1 * | 8/2002 | DeRolf et al. | 714/30 |
| 2002/0124124 A1 | 9/2002 | Matsumoto et al. | |
| 2002/0147560 A1 | 10/2002 | Devins et al. | |
| 2002/0147843 A1 | 10/2002 | Rao | |
| 2002/0156918 A1 | 10/2002 | Valdevit et al. | |
| 2002/0172195 A1 | 11/2002 | Pekkala et al. | |
| 2002/0191602 A1 | 12/2002 | Woodring et al. | |
| 2002/0196773 A1 | 12/2002 | Berman | |
| 2003/0002503 A1 | 1/2003 | Brewer et al. | |
| 2003/0016683 A1 | 1/2003 | George et al. | |
| 2003/0021239 A1 | 1/2003 | Mullendore et al. | |
| 2003/0026267 A1 | 2/2003 | Oberman et al. | |
| 2003/0026287 A1 | 2/2003 | Mullendore et al. | |
| 2003/0035433 A1 | 2/2003 | Craddock et al. | |
| 2003/0046396 A1 | 3/2003 | Richter et al. | |
| 2003/0056000 A1 | 3/2003 | Mullendore et al. | |
| 2003/0072316 A1 | 4/2003 | Niu et al. | |
| 2003/0079019 A1 | 4/2003 | Lolayekar et al. | |
| 2003/0084219 A1 | 5/2003 | Yao et al. | |
| 2003/0086377 A1 | 5/2003 | Berman | |
| 2003/0091062 A1 | 5/2003 | Lay et al. | |

| | | | |
|---|---|---|---|
| 2003/0103451 A1 | 6/2003 | Lutgen et al. | |
| 2003/0117961 A1 | 6/2003 | Chuah et al. | |
| 2003/0120983 A1 | 6/2003 | Vieregge et al. | |
| 2003/0126223 A1 | 7/2003 | Jenne et al. | |
| 2003/0137941 A1 | 7/2003 | Kaushik et al. | |
| 2003/0174789 A1 | 9/2003 | Waschura et al. | |
| 2003/0179709 A1 | 9/2003 | Huff | |
| 2003/0179748 A1 | 9/2003 | George et al. | 370/389 |
| 2003/0189930 A1 | 10/2003 | Terrell et al. | |
| 2003/0189935 A1 | 10/2003 | Warden et al. | |
| 2003/0195983 A1 | 10/2003 | Krause | |
| 2003/0229808 A1 | 12/2003 | Heintz et al. | |
| 2003/0236953 A1 | 12/2003 | Grieff et al. | |
| 2004/0013092 A1 | 1/2004 | Betker et al. | |
| 2004/0013125 A1 | 1/2004 | Betker et al. | |
| 2004/0015638 A1 | 1/2004 | Bryn | |
| 2004/0024831 A1 | 2/2004 | Yang et al. | |
| 2004/0028038 A1 | 2/2004 | Anderson et al. | |
| 2004/0057389 A1 | 3/2004 | Klotz et al. | |
| 2004/0081186 A1 | 4/2004 | Warren et al. | |
| 2004/0081394 A1 | 4/2004 | Biren et al. | |
| 2004/0085955 A1 | 5/2004 | Walter et al. | |
| 2004/0100944 A1 | 5/2004 | Richmond et al. | |
| 2004/0109418 A1 | 6/2004 | Fedorkow et al. | |
| 2004/0123181 A1* | 6/2004 | Moon et al. | 714/13 |
| 2004/0141521 A1 | 7/2004 | George | 370/463 |
| 2004/0153914 A1* | 8/2004 | El-Batal | 714/724 |
| 2004/0174813 A1 | 9/2004 | Kasper et al. | |
| 2004/0208201 A1 | 10/2004 | Otake | |
| 2004/0267982 A1 | 12/2004 | Jackson et al. | |
| 2005/0023656 A1 | 2/2005 | Leedy | |
| 2005/0036499 A1 | 2/2005 | Dutt et al. | |
| 2005/0117522 A1 | 6/2005 | Basavaiah et al. | |
| 2005/0177641 A1 | 8/2005 | Yamagami | |
| 2006/0013248 A1 | 1/2006 | Mujeeb et al. | |
| 2006/0047852 A1 | 3/2006 | Shah et al. | |
| 2006/0074927 A1 | 4/2006 | Sullivan et al. | |
| 2006/0184711 A1 | 8/2006 | Pettey | |

FOREIGN PATENT DOCUMENTS

| | | |
|---|---|---|
| EP | 0856969 | 1/1998 |
| WO | WO-98/36537 | 8/1998 |
| WO | WO03/088050 | 10/2003 |

OTHER PUBLICATIONS

Malavalli, Kumar, et al., "Distributed Computing with fibre channel fabric", Proc of the Computer Soc. Int'l Conf., Los Alamitos, IEEE Comp Soc. Press., vol. Conf. 37, XP000340745, (Feb. 24, 1992), pp. 269-274.

Martin, Charles R., "Fabric Interconnection of fibre channel standard nodes", Proceedings of the SPIE, (Sep. 8, 1992), pp. 65-71.

Yoshida, Hu, "LUN Security Considerations for Storage Area Networks," Hitachi Data Systems Paper—XP 002185193 (1999), pp. 1-7.

Claudio DeSanti, "Virtual Fabrics Switch Support"; VF Switch Support, T11/04-395v2. Sep. 2004, pp. 1-15.

Pelissier et al, "Inter-Fabric Routing", dated Jul. 30, 2004, Inter Fabric Routing (04-520v0); pp. 1-31.

DeSanti et al, "Virtual Fabrics"; Virtual Fabrics, T11/03-352v0, May 2003; pp. 1-4.

Martin et al , "Virtual Channel Architecture", Presentation by Brocade to T11/03-369V0 dated Jun. 2, 2003.

U.S. Appl. No. 10/266,360, filed Oct. 7, 2002, Method And System For Reducing Congestion In Computer Networks.

U.S. Appl. No. 10/241,153, filed Sep. 11, 2002, Zone Management In A Multi-Module Fibre Channel Switch.

U.S. Appl. No. 10/263,858, filed Oct. 3, 2002, Method And System For Using Distributed Name Servers In Multi-Module Fibre Channel Switching.

U.S. Appl. No. 10/212,425, filed Aug. 5, 2002, Method And System For Flexible Routing In A Fibre Channel System.

U.S. Appl. No. 10/302,149, filed Nov. 22, 2002, Method And System For Controlling Packet Flow In Networks.

U.S. Appl. No. 10/894,579, filed Jul. 20, 2004, Method and System for Managing Traffic in Fibre Channel Switches.

U.S. Appl. No. 10/894,546, filed Jul. 20, 2004, Method and System for Routing and Filtering Network Data Packets in Fibre Channel Systems.

U.S. Appl. No. 10/894,827, filed Jul. 20, 2004, Method and System for Selecting Virtual Lanes in Fibre Channel Switches.

U.S. Appl. No. 10/894,597, filed Jul. 20, 2004, Programmable Pseudo Virtual Lanes for Fibre Channel Systems.

U.S. Appl. No. 10/894,595, filed Jul. 20, 2004, Method and System for Reducing Latency and Congestion in Fibre Channel Switches.

U.S. Appl. No. 10/664,548, filed Sep. 19, 2003, Buffer to Buffer Credit Recovery for In-Line Fibre Channel Credit Extension Devices.

U.S. Appl. No. 10/895,175, filed Jul. 20, 2004, Method and System for Detecting Congestion and Over Subscription in a Fibre Channel Network.

U.S. Appl. No. 10/894,492, filed Jul. 20, 2004, LUN Based Hard Zoning in Fibre Channel Switches.

U.S. Appl. No. 10,894,587, filed Jul. 20, 2004, Multi Speed Cut Through Opertion in Fibre Channel Switches.

U.S. Appl. No. 10/894,726, filed Jul. 20, 2004, Method and System for Improving Bandwidth & Reducing Idles in Fibre Channel Switches.

U.S. Appl. No. 10/894,629, filed Jul. 20, 2004, Method and System for Routing Fibre Channel Systems.

U.S. Appl. No. 10/894,491, filed Jul. 20, 2004, Method and System for Keeping a Fibre Channel Arbitrated Loop Open During Frame Gaps.

U.S. Appl. No. 10/894,536, filed Jul. 20, 2004, Method And System For Congestion Control Based On Optimum Bandwidth Allocation In A Fibre Channel Switch.

U.S. Appl. No. 10/894,627, filed Jul. 20, 2004, Method and System for Programmable Data Dependent Network Routing.

U.S. Appl. No. 10/719,077, filed Nov. 21, 2003, Method and System for Monitoring Events in Storage Area Networks.

U.S. Appl. No. 10/894,689, filed Jul. 20, 2004, Method and System for Power Control of Fibre Channel Switches.

U.S. Appl. No. 10/798,527, filed Mar. 11, 2004, Method and System for Preventing Deadlock in Fibre Channel Fabrics using Frame Priorities.

U.S. Appl. No. 10/798,468, filed Mar. 11, 2004, Method and System for Reducing Deadlock in Fibre Channel Fabrics using Virtual Lanes.

U.S. Appl. No. 10/894,586, filed Jul. 20, 2004, Method and System for Buffer to Buffer Credit recovery in Fibre Channel Systems Using Virtual and/or Pseudo Virtual Lane.

U.S. Appl. No. 10/889,635, filed Jul. 12, 2004, Method And System For Inexpensive And Non-Disruptive Data Capture In Networks.

U.S. Appl. No. 10/889,259, filed Jul. 12, 2004, Method And Apparatus For Detecting And Removing Orphaned Primitives In A Fibre Channel Network.

U.S. Appl. No. 10/889,267, filed Jul. 12, 2004, Method And System For Fibre Channel Arbitrated Loop Acceleration.

U.S. Appl. No. 10/889,551, filed Jul. 12, 2004, Method And Apparatus For Testing Loop Pathway Integrity In A Fibre Channel Arbitrated Loop.

U.S. Appl. No. 10/889,256, filed Jul. 12, 2004, Method And Apparatus For Accelerating Receive-Modify-Send Frames In A Fibre Channel Network.

U.S. Appl. No. 10/889,255, filed Jul. 12, 2004, Method and Appartus for Test Pattern Generation.

U.S. Appl. No. 10/889,588, filed Jul. 12, 2004, Method And Apparatus For Improving Buffer Utilization In Communication Networks.

U.S. Appl. No. 10/894,597, filed Jul. 20, 2004, Method And System For Using Extended Fabric Features With Fibre Channel Switch Elements.

U.S. Appl. No. 10/894,978, filed Jul. 29, 2004, Method And System for Programmable Data Dependent.

U.S. Appl. No. 10/894,917, filed Jul. 29, 2004, Method and System for Configuring Fibre Channel Ports.
U.S. Appl. No. 10/894,529, filed Jul. 20, 2004, Integrated Fibre Channel Fabric Controller.
U.S. Appl. No. 10/894,732, filed Jul. 20, 2004, Method And System For Congestion Control In A Fibre Channel Switch.
U.S. Appl. No. 10/957,465, filed Oct. 1, 2004, Method and System for Using Boot Servers in Fibre Channel Network Routing.
U.S. Appl. No. 10/956,717, filed Oct. 1, 2004, Method and System for Transferring Data directly between storage devices in a Storage Area Networks.
U.S. Appl. No. 10/956,501, filed Oct. 1, 2004, High Speed Fibre Channel Switch Elements.
U.S. Appl. No. 10/956,502, filed Oct. 1, 2004, Method and System for LUN Remapping in Fibre Channel Networks.
U.S. Appl. No. 10/961,463, filed Oct. 8, 2004, Fibre Channel Transparent Switch For Mixed Switch Fabrics.
U.S. Appl. No. 10/956,718, filed Oct. 1, 2004, Method and System for Using an In-Line Credit Extender with a Host Bus Adapter.
Curtis, A. R., "Design Considerations for 10-Gbit Fibre Channel", *Curtis A. Ridgeway, Distinguished I/O Architect, Storage and Computing ASIC's Division, LSI Logic Corp.*, (Apr. 14, 2003) http://www.commsdesign.com/showarticle. jhtml?articleID=16500902.
Malavalli, Kumar , "High Speed Fibre Channel Switching Fabric Devices", *Proceedings of the SPIE, SPIE*, Bellingham, VA, USA vol. 1577,, XP000562869, ISSN: 0277-786X,(Sep. 4, 1991),216-226.
Melhem, et al., "Minimizing Wavelength Conversions in WDM Path Establishment", *Computer Science Department*, University of Pittsburgh, Pittsburgh, PA 15260, (2001), 197-211.
Ridgeway, Curt , "0GFC-40GFC using 4-lane XAUI's", *LSI Logic Presentation—T11/03-069v0*.
"Deliver Server-Free Backup", *Pathlight & Computer Associates*, White Paper of Apr. 2000, Ithaca, New York, XP-002381153, 1-8.
Naik, D. , "Inside Windows Storage:Server Storage Technologies for Windows 2000, Windows Server 2003 and Beyond", *Addison-Wesley*, US, Chapter 5, XP-002381152, (Jul. 15, 2003),137-173.
Brown, Douglas W., "A State-Machine Synthesizer", *18th Design Automation Conference*, (1981),301-305.
Banks, David C., et al., "Link Trunking and Measuring Link Latency in Fibre Channel Fabric", U.S. Appl. No. 60/286,046, 1-52.
"Examination Report from the European Patent Office dated Oct. 12, 2007 for European Application No. 05 805 632.6".
Malavalli, et al., "Fibre Channel Framing and Signaling (FC-FS) REV 1.10", *NCITS working draft proposed American National Standard for Information Technology*, (Jan. 25, 2001).
"Office Action from USPTO dated Oct. 25, 2007 for U.S. Appl. No. 10/894,536".
"Office Action from USPTO dated Nov. 13, 2007 for U.S. Appl. No. 10/894,586".
"Office Action from USPTO dated Oct. 17, 2007 for U.S. Appl. No. 10/894,917".
"Office Action from USPTO dated Jun. 28, 2007 for U.S. Appl. No. 10/894,529".
"Office Action from USPTO dated Sep. 14, 2007 for U.S. Appl. No. 10/894,978".
"Office Action from USPTO dated Apr. 6, 2007 for U.S. Appl. No. 10/956,718".
"Office Action from USPTO dated Oct. 3, 2007 for U.S. Appl. No. 10/956,717".
"Office Action from USPTO dated Jun. 1, 2007 for U.S. Appl. No. 10/961,463".
"Office Action from USPTO dated Jan. 19, 2006 for U.S. Appl. No. 10/212,425".
"Office Action from USPTO dated Dec. 5, 2005 for U.S. Appl. No. 10/212,425".
"Office Action from USPTO dated May 21, 2007 for U.S. Appl. No. 10/212,425".
"Office Action from USPTO dated Oct. 18, 2006 for U.S. Appl. No. 10/241,153".
"Office Action from USPTO dated Apr. 3, 2007 for U.S. Appl. No. 10/241,153".
"Office Action from USPTO dated Nov. 16, 2007 for U.S. Appl. No. 10/241,153".
"Office Action from USPTO dated Nov. 15, 2006 for U.S. Appl. No. 10/263,858".
"Office Action from USPTO dated Jul. 11, 2007 for U.S. Appl. No. 10/263,858".
"Office Action from USPTO dated Jan. 19, 2007 for U.S. Appl. No. 10/302,149".
"Office Action from USPTO dated Aug. 20, 2007 for U.S. Appl. No. 10/302,149".
"Office Action from USPTO dated Jul. 3, 2007 2007 for U.S. Appl. No. 10/664,548".
"Office Action from USPTO dated Sep. 20, 2007 for U.S. Appl. No. 10/798,527".
"Office Action from USPTO dated Sep. 20, 2007 for U.S. Appl. No. 10/889,267".
"Office Action from USPTO dated Aug. 31, 2007 for U.S. Appl. No. 10/889,635".
"Office Action from USPTO dated Mar. 21, 2006 for U.S. Appl. No. 10/889,588".
"Office Action from USPTO dated Sep. 10, 2007 for U.S. Appl. No. 10/889,255".
"Office Action from USPTO dated Sep. 4, 2007 for U.S. Appl. No. 10/889,551".
"Office Action from USPTO dated Sep. 20, 2007 for U.S. Appl. No. 10/889,259".
"Office Action from USPTO dated Sep. 19, 2007 for U.S. Appl. No. 10/894,492".
"Office Action from USPTO dated Oct. 4, 2007 for U.S. Appl. No. 10/894,627".
"Office Action from USPTO dated Oct. 25, 2007 for U.S. Appl. No. 10/894,491".
"Office Action from USPTO dated Oct. 23, 2007 for U.S. Appl. No. 10/894,597".
"Office Action from USPTO dated Oct. 25, 2007 for U.S. Appl. No. 10/894,579".
"Office Action from USPTO dated Oct. 11, 2007 for U.S. Appl. No. 10/894,629".

* cited by examiner

Frame Manager Block Diagram

METHOD AND SYSTEM FOR MINIMIZING DISRUPTION IN COMMON-ACCESS NETWORKS

CROSS-REFERENCE TO RELATED APPLICATIONS

This application claims priority under 35 USC Section 119(e), to the following provisional patent applications:

Ser. No. 60/487,876 filed on Jul. 16, 2003;
Ser. No. 60/487,887 filed on Jul. 16, 2003;
Ser. No. 60/487,875 filed on Jul. 16, 2003;
Ser. No. 60/490,747 filed on Jul. 29, 2003;
Ser. No. 60/487,667 filed on Jul. 16, 2003;
Ser. No. 60/487,665 filed on Jul. 16, 2003;
Ser. No. 60/492,346 filed on Aug. 4, 2003; and
Ser. No. 60/487,873 filed on Jul. 16, 2003.

The disclosures of the foregoing applications are incorporated herein by reference in their entirety.

BACKGROUND

1. Field of the Invention

The present invention relates to networks, and more particularly to prevent disruptions in networks.

2. Background of the Invention

In a common-access network, every attached network device detects all traffic on the network, and each device determines through network-specific hand shaking when to claim data from the network. Examples of common-access networks include Ethernet, Fibre Channel—Arbitrated Loop (FC-AL), and Token-Ring.

Because each device detects all traffic on a common-access network, certain behaviors from a single network device would disrupt all network devices. For example, a FC-AL device may initiate loop initialization and disrupt all traffic in FC-AL. Similarly; a beaconing condition would disrupt all traffic on a Token-Ring network.

Hence, isolation of disruptive events (or devices) is a challenge for modern networks. The following introduces Fibre Channel standards/terminology and also describes some of the challenges that a FC-AL topology faces in this context.

Fibre channel is a set of American National Standard Institute (ANSI) standards, which provide a serial transmission protocol for storage and network protocols such as HIPPI, SCSI, IP, ATM and others. Fibre channel provides an input/output interface to meet the requirements of both channel and network users.

Fibre channel supports three different topologies: point-to-point, arbitrated loop and fibre channel fabric. The point-to-point topology attaches two devices directly. The arbitrated loop topology attaches devices in a loop. The fibre channel fabric topology attaches host systems directly to a fabric, which are then connected to multiple devices. The fibre channel fabric topology allows several media types to be interconnected.

Fibre channel is a closed system that relies on multiple ports to exchange information on attributes and characteristics to determine if the ports can operate together. If the ports can work together, they define the criteria under which they communicate.

In fibre channel, a path is established between two nodes where the path's primary task is to transport data from one point to another at high speed with low latency, performing only simple error detection in hardware.

FC-AL is one fibre channel standard (incorporated herein by reference in its entirety) that establishes the protocols for an arbitrated loop topology. Conventional elements in a FC-AL topology are not robust and do not provide an efficient way to identify, isolate and manage loop traffic.

One such problem is shown in system 210 of FIG. 2B. System 210 includes a fibre channel element (or a switch) 216 that couples host systems 213-215 to storage systems 217 and 218. Storage system 217 and 218 include redundant array of independent disks (RAID) 211 and 219 coupled via plural input/output ("I/O") modules (212) and RAID controllers 201A and 201B. If drive 219 is defective, it may disrupt all traffic in common-access network 220. This can result in loop failure and lower performance of the overall network. To discover the defective device in a common-access network, the system administrator may have few options other than removing devices until the network disruption ceases.

Another example is shown in FIG. 2A, where a RAID controller 201 is coupled to two different loops 209A and 208A via links 209 and 208 in a disk array system 200. Each loop has a small computer systems interface (SCSI) enclosure services ("SES") module 202 and 202A. SES modules 202 and 202A comply with the SES industry standard that is incorporated herein by reference in its entirety.

Port Bypass Circuit (or PBC) modules 203 (and 206) couple plural disks (for example, 204, 202B and 207) and link 205 couples the PBC modules.

If drive 202B, which is dual ported, fails then both loops 209A and 208A are disrupted. Again, conventional techniques will require that storage 202A be removed and a bypass command issued to all drives, which takes the entire array off-line. Each device is attached and detached to investigate the reason for a link failure. Then all the drives, except the faulty drive are re-attached and loop activity is restored. This system of trial and error is labor intensive and inefficient.

Therefore, what is required is a process and system that can identify, isolate and manage loop faulty devices in common access networks, including the FC-AL topology.

SUMMARY OF THE INVENTION

In one aspect of the present invention, a method for isolating a defective device that is coupled to a fibre channel arbitrated loop in a network is provided. The method includes, isolating a port if a loop initialization primitive ("LIP") is detected from a device coupled to the arbitrated loop; configuring the device and acquiring an AL_PA; determining if the device is sending LIPs; and isolating the device if the device continues to send LIPs. The method also includes connecting the device to the network if the device stops sending LIPs after it is configured.

In another aspect of the present invention, a fibre channel switch element having more than one port for connecting devices in a network is provided. The switch element includes, a port having an isolation state machine that allows the switch element to isolate a device whose behavior may result in disruption of other devices in the network. The state machine may also configure a device after detecting disruptive parameters from the device and perform diagnostic operations on the device.

In yet another aspect of the present invention, a network for connecting devices is provided. The network includes a fibre channel switch element including a port having an isolation state machine that allows the switch element to isolate a device whose behavior may result in disruption of other devices in the network.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

Definitions:

The following definitions are provided as they are typically (but not exclusively) used in the fibre channel environment, implementing the various adaptive aspects of the present invention.

"AL_PA": Arbitrated loop physical address.

"FC-AL": Fibre channel arbitrated loop process described in FC-AL standard.

"Fibre channel ANSI Standard": The standard describes the physical interface, transmission and signaling protocol of a high performance serial link for support of other high level protocols associated with IPI, SCSI, IP, ATM and others.

"FC-1": Fibre channel transmission protocol, which includes serial encoding, decoding and error control.

"FC-2": Fibre channel signaling protocol that includes frame structure and byte sequences.

"FC-3": Defines a set of fibre channel services that are common across plural ports of a node.

"FC-4": Provides mapping between lower levels of fibre channel, IPI and SCSI command sets, HIPPI data framing, IP and other upper level protocols.

"LIP": Loop initialization protocol primitive.

"L_Port": A port that contains Arbitrated Loop functions associated with the Arbitrated Loop topology.

"PBC": Port Bypass Circuit.

"SES": SCSI Enclosure Services.

"TPE": Transmission Protocol Engine, a controller that operates at the FC-1 level.

To facilitate an understanding of the preferred embodiment, the general architecture and operation of a fibre channel system will be described. The specific architecture and operation of the preferred embodiment will then be described with reference to the general architecture of the fibre channel system.

Figure 1:
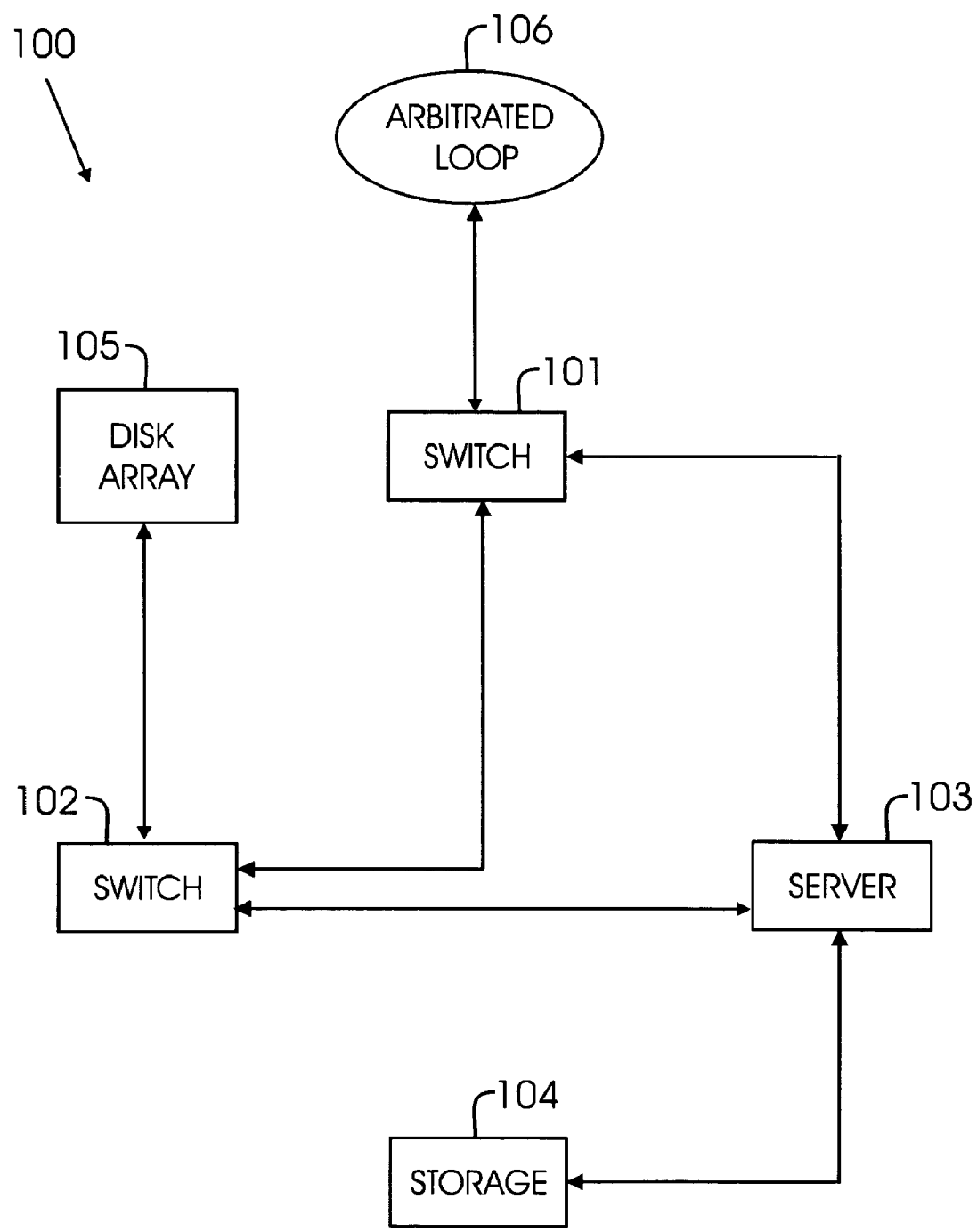
FIG. 1 shows a block diagram of a storage area network.
Figure 2A:
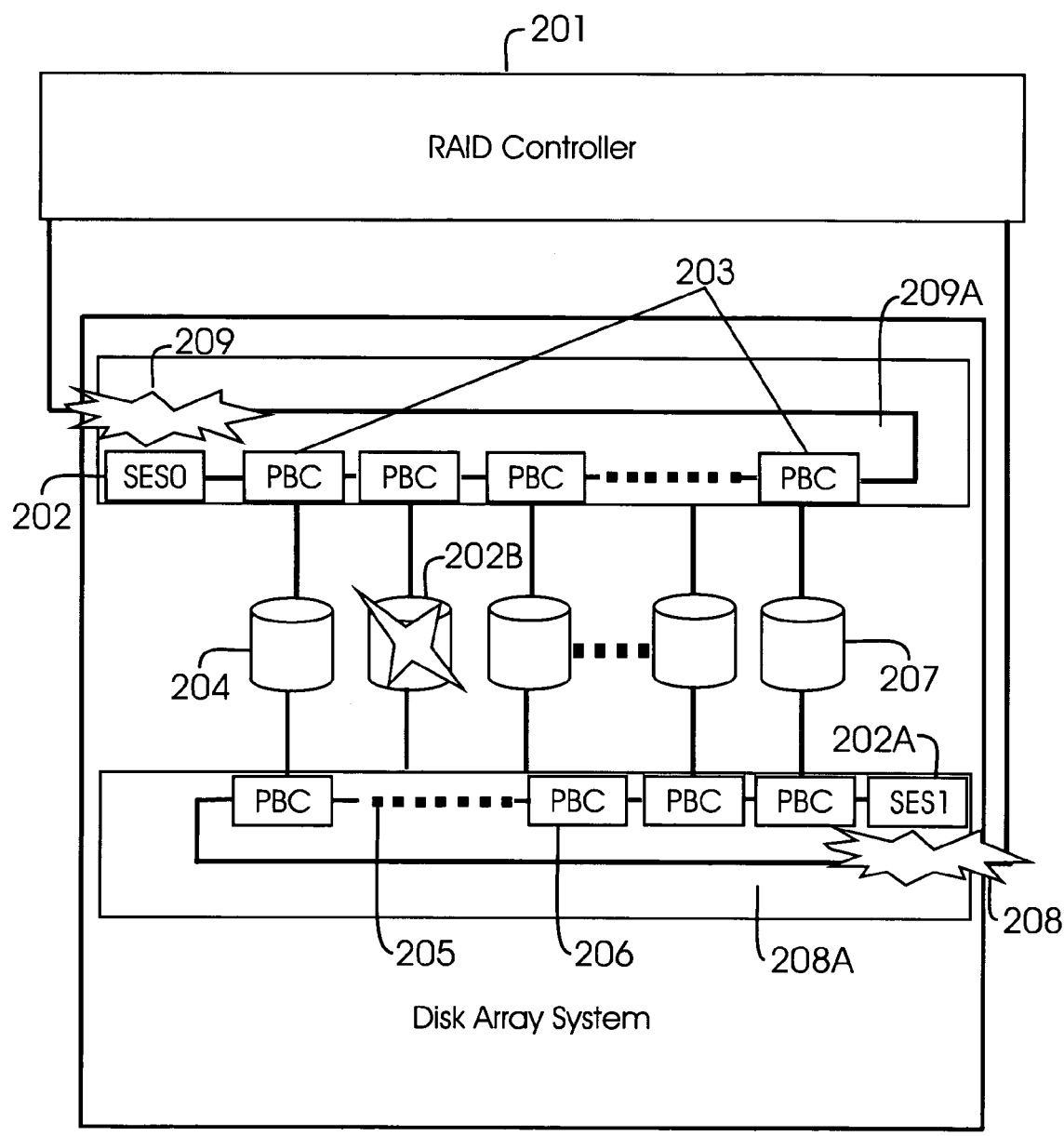
FIGS. 2A-2B show disruptive configurations that use the adaptive aspects of the present invention.
Figure 2B:
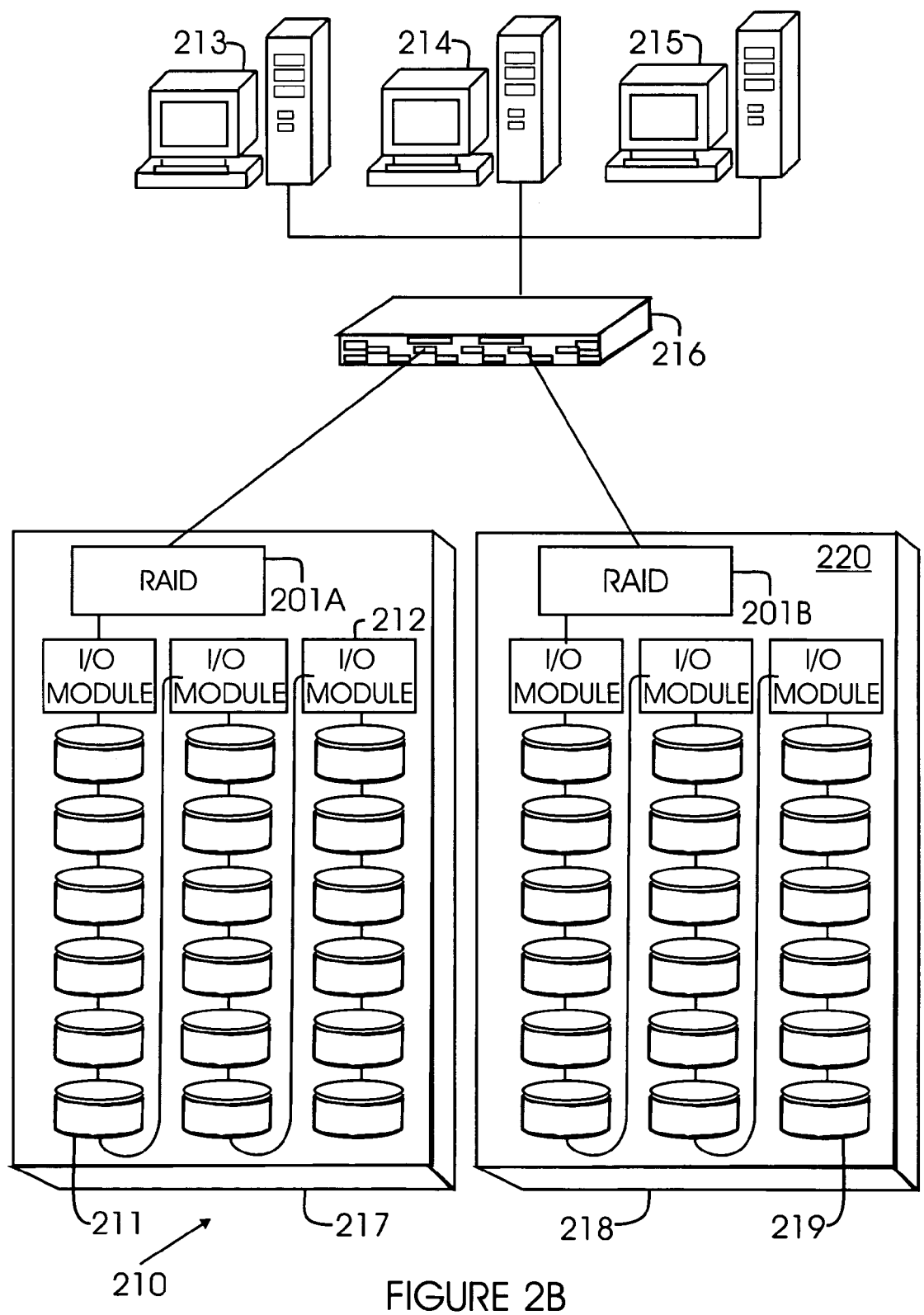

FIG. 1 is a block diagram of a fibre channel system 100 implementing the methods and systems in accordance with the adaptive aspects of the present invention. System 100 includes plural devices that are interconnected. Each device includes one or more ports, classified as node ports (N_Ports), fabric ports (F_Ports), and expansion ports (E_Ports). Node ports may be located in a node device, e.g. server 103, disk array 105 and storage device 104. Fabric ports are located in fabric devices such as switch 101 and 102. Arbitrated loop 106 may be operationally coupled to switch 101 using arbitrated loop ports (FL_Ports).

The devices of FIG. 1 are operationally coupled via "links" or "paths". A path may be established between two N_ports, e.g. between server 103 and storage 104. A packet-switched path may be established using multiple links, e.g. an N-Port in server 103 may establish a path with disk array 105 through switch 102.

Figure 3A:
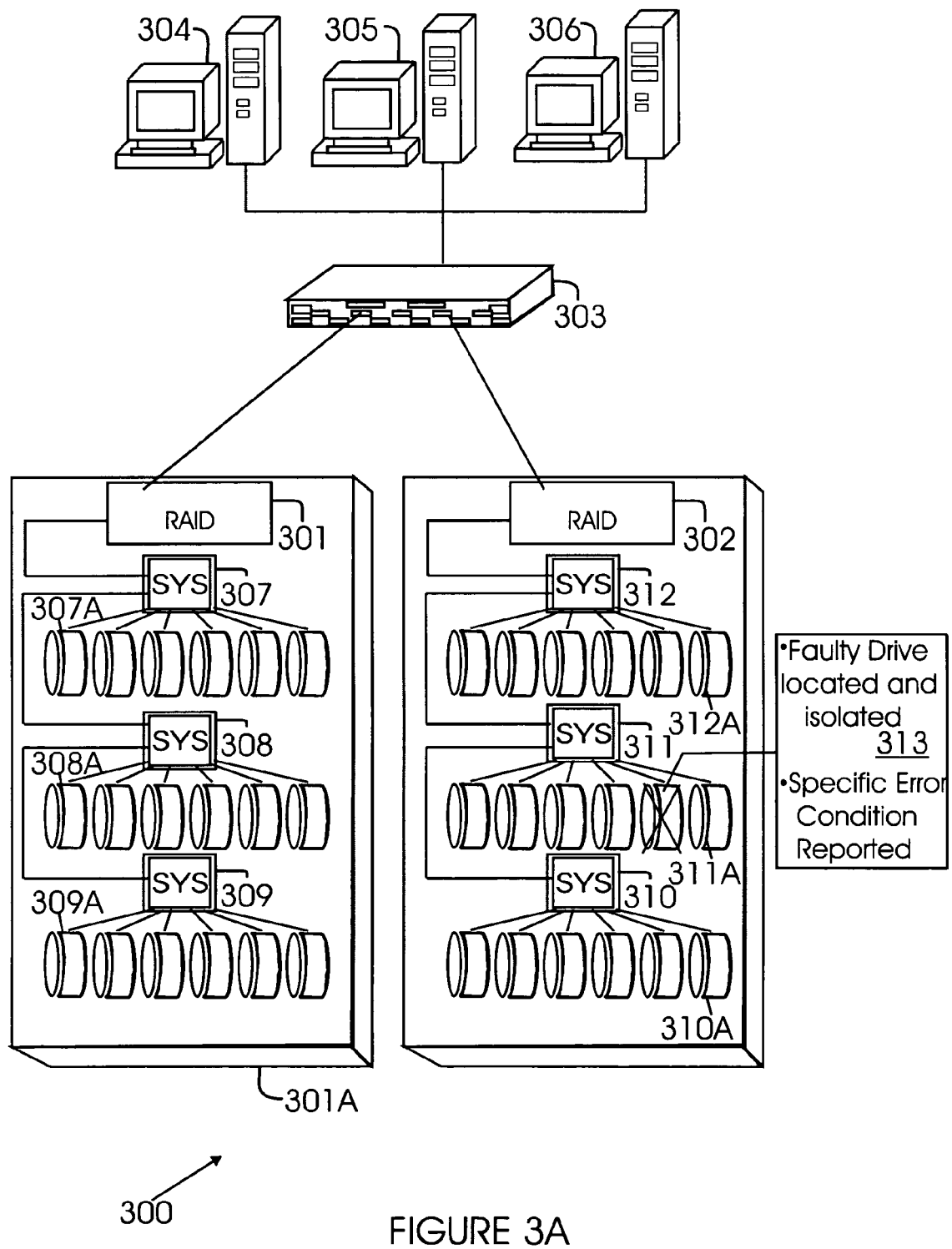
FIGS. 3A-3C show block diagrams of various system level configurations, according to one aspect of the present invention.

FIG. 3A shows a block diagram of the top-level architecture for system 300 according to one aspect of the present invention. System 300 includes system 307 (a Fibre Channel element) operationally coupled to an array of storage devices 307A that is coupled to a RAID controller 301. RAID system 301A is coupled to switch 303 that is coupled to various computing systems (304-306). System 308, 309, 310, 311 and 312 coupled to storage devices 308A, 309A, 310A, 311A and 312A, are similar to 307/307A configuration.

System 307 (or 308-312) allows faulty disks to be easily segregated. For example, if a drive 313 in string 311A is faulty, then system 311 allows drive 313 to be separated, while normal traffic in arrays 301A and 310A continues.

Figure 3B:
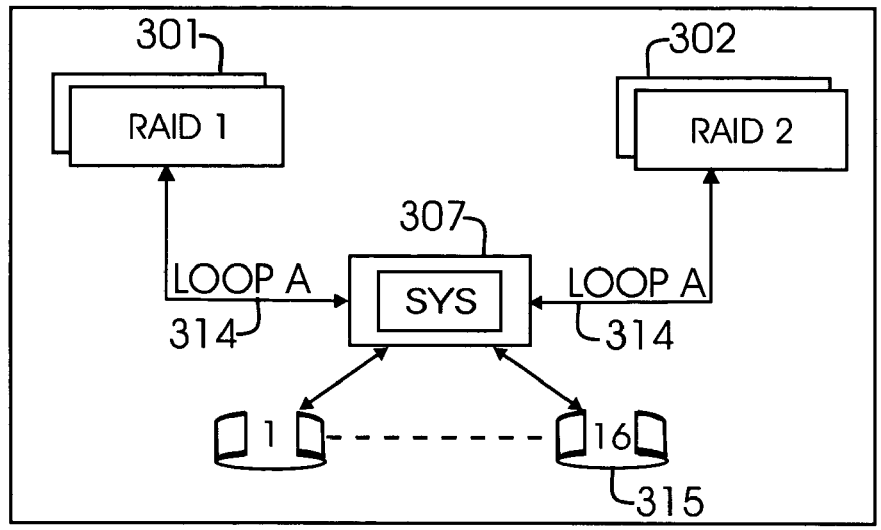

FIG. 3B shows how system 307 operationally couples RAID controller 301 and 302 to disk array 315 (similar to 307A) via loop 314, according to one aspect of the present invention. Both RAID controllers have access to all the drives.

Figure 3C:
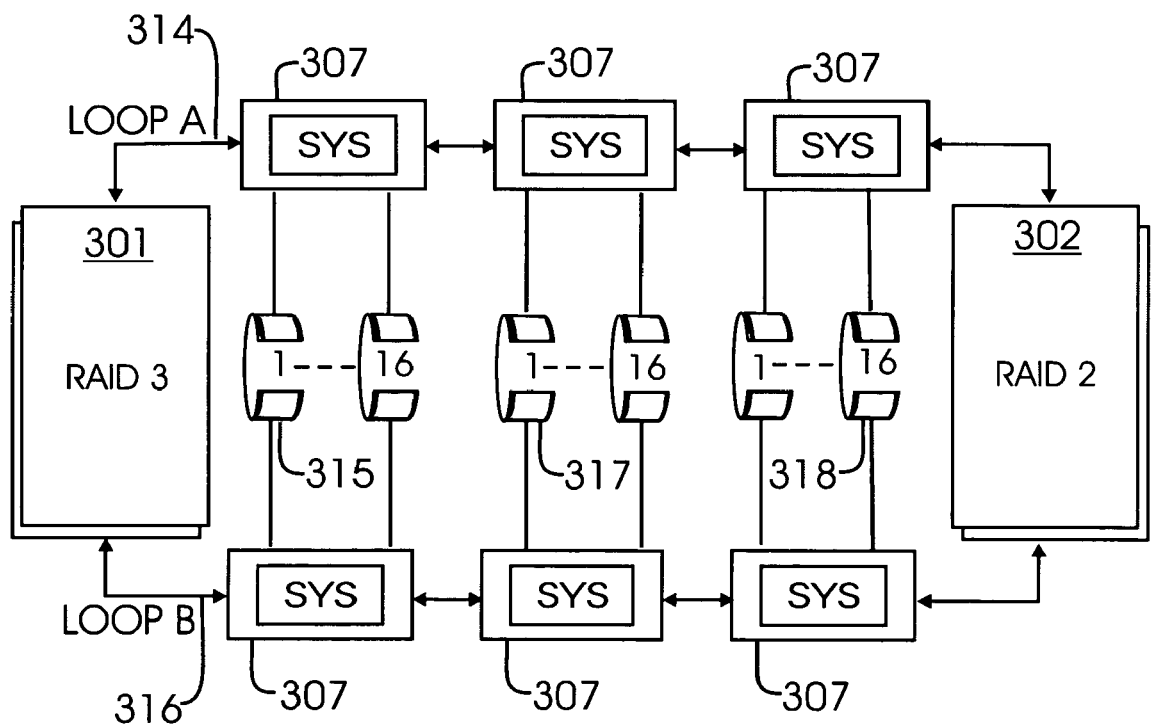

FIG. 3C shows plural system 307 coupled to RAID controllers 301 and 302 to provide access to arrays 315, 317 and 318 using loops 314 and 316, according to one aspect of the present invention.

Figure 4:
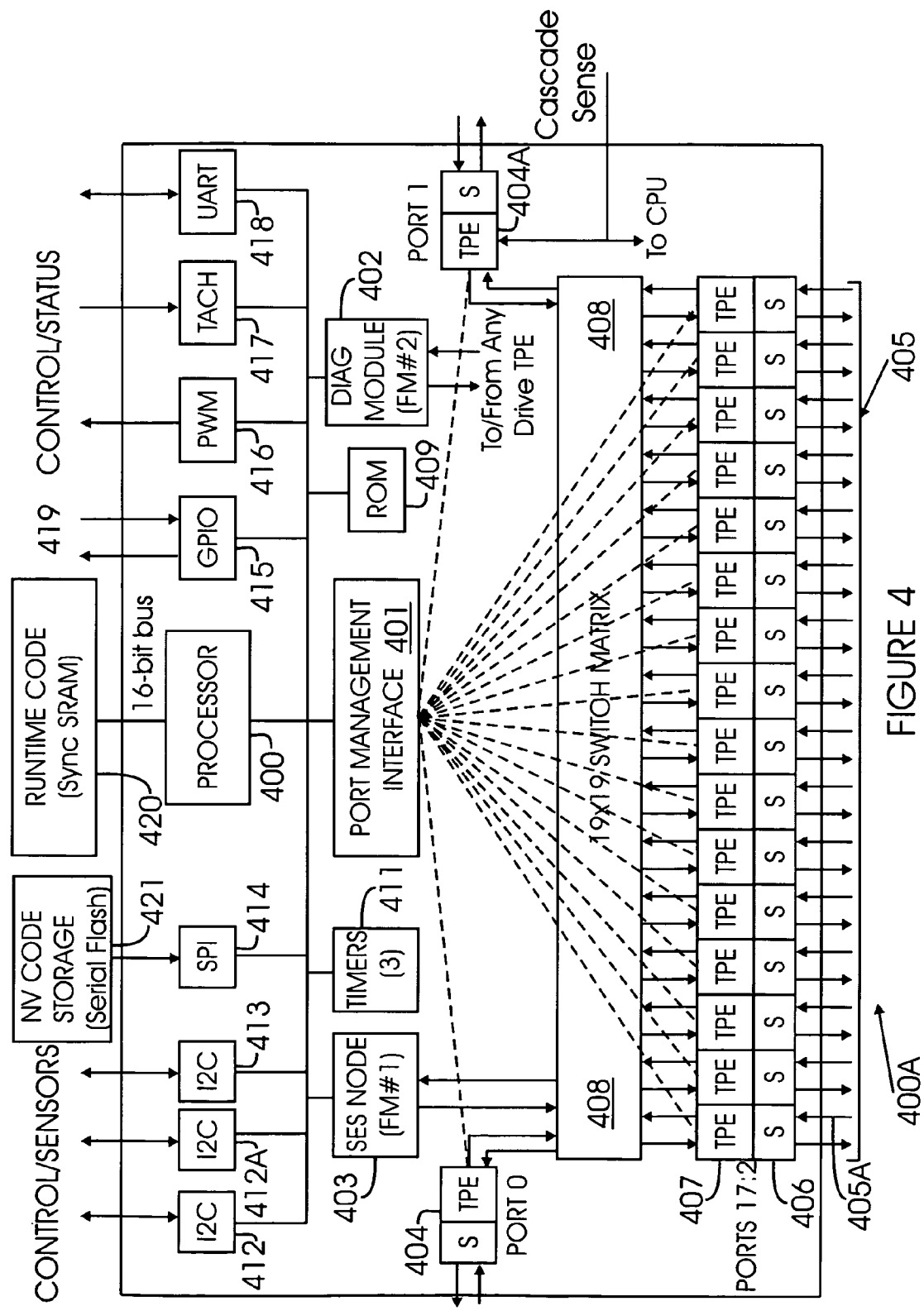
FIG. 4 shows a block diagram of a switch element, according to one aspect of the present invention.

FIG. 4 is a block diagram of an 18-port ASIC FC element 400A (also referred to as system 307) according to one aspect of the present invention. FC element 400A provides various functionality in an FC-AL environment, including without limitation, FC element 400A operates as a loop controller and loop switch using switch matrix 408, in accordance with the FC-AL standard.

FC element 307 of the present invention is presently implemented as a single CMOS ASIC, and for this reason the term "FC element" and ASIC are used interchangeably to refer to the preferred embodiments in this specification.

Although FIG. 4 shows 18 ports, the present invention is not limited to any particular number of ports.

System 400A provides a set of port control functions, status indications, and statistics counters for monitoring the health of the loop and attached devices, diagnosing faults, and recovering from errors.

ASIC 400A has 18 ports where 16 ports are shown as numeral 405 while a host port 404 and cascade port 404A are shown separately for convenience only. These ports are generic to common Fibre Channel port types, for example, L_Ports.

For illustration purposes only, all ports are drawn on the same side of ASIC 400A in FIG. 4. However, the ports may be located on any side of ASIC 400A. This does not imply any difference in port or ASIC design. Actual physical layout of the ports will depend on the physical layout of the ASIC.

Each port has transmit and receive connections to switch matrix 408 and includes transmit protocol engine 407 and a serial/deserializer 406. Frames enter/leave the link 405A and SERDES 406 converts data into 10-bit parallel data to fibre channel characters.

Switch matrix 408 dynamically establishes a connection for loop traffic. Switch matrix 408 includes a global arbiter (hence switch matrix 408 is also referred to as SGA 408) that provides lower latency and improved diagnostic capabilities while maintaining full Fibre Channel Arbitrated Loop (FC-AL) compliance.

Switch matrix 408 provides a quasi-direct architecture in the form of a buffer-less Switch Matrix. Switch matrix 408 includes data multiplexers that provide a path to each port. In one aspect, twenty multiplexers may be used. In one aspect, data is 16 bits wide plus the internal "K" control signal and two parity bits.

At power-up, SGA 408 is setup in a flow-through configuration, which means all ports send what was received on host port 404. When a valid LIP sequence occurs, SGA 408 configures the switch to a complete loop configuration for the address selection process. During normal data transfer on the loop, SGA 408 reconfigures the switch data-path to connect the active ports in what appears as a smaller loop, which lowers the latency but still emulates FC-AL functionality to all entities on the loop.

During loop configuration, SGA 408 configures the switch data-path to include a snooping port that walks through each port during the LIP physical address assignment to track each port's assigned arbitrated loop physical address (AL_PA). This snooping process is called the 'LIP walk'. When the LIP process is done, the firmware records the "port to AL_PA" map in an internal table built in SGA 408. During normal data transfer mode, SGA 408 monitors arbitration requests, open requests, and close primitives to determine which ports have traffic that must be forwarded. The ports that have traffic for the loop provide the necessary information to create the connection points for the switch data-path. The inactive ports are provided the primitive ARB(F0).

SGA 408 selects the arbitration winner, from all the arbitrating ports, according to Fibre Channel Arbitrated Loop (FC-AL) rules. For ports, which detect arbitration, the AL_PA is looked up in a Port Address Table to see if the arbitration request is valid for that port. Due to the unique purpose of port 0 (Host port 404), port 0 never needs to win arbitration, but can detect that the arbitration winner is outside a range, or with ARB(F0)/IDLE show that devices outside system 307 are not arbitrating at a given time.

For arbitration detect on host port 404 to be considered valid the "ArbPS0" cannot match an AL_PA in the internal Port Address Table, which means that the source address is not in a particular system 307. For ports seeking a valid arbitration, the AL_PA determines which arbitrating device has highest priority; and typically, the port with the lowest AL_PA value is always selected as the winner.

SGA 408 creates a direct loop connection between source and destination devices. This connection methodology avoids the delay associated with data having to pass from one disk drive member of the loop to the next until the data has completed traversing the loop. In one aspect, the following formula evaluates performance of a loop connection:

Latency (word times)=$n*(2*8)$+disk+host=$16n+12$

Where n is the number of systems 307 that comprise the FC loop, 6 is the latency of the disk drive that is part of the loop connection and 6 is typically the latency of the attached host.

System 307 includes plural 12C (12C standard compliant) interfaces 412-413 that allow system 307 to couple to plural I2C ports each having a master and slave capability.

System 307 also includes a general purpose input/output interface ("GPIO") 415. This allows information from system 307 to be analyzed by any device that can use GPIO 415. Control/Status information 419 can be sent or received through module 415.

System 307 also includes a SPI module 414 that is used for parallel to serial and serial to parallel transfer between processor 400 firmware and flash memory 421 in the standard Little Endian format.

System 307 also includes a Universal Asynchronous Receiver/Transmitter ("UART") interface 418 that converts serial data to parallel data (for example, from a peripheral device modem or data set) and vice-versa (data received from processor 400) complying industry standard requirements.

System 307 can also process tachometer inputs (received from a fan, not shown) using module 417. Processor 400 can read the tachometer input via a tachometer rate register and status register (not shown).

System 307 provides pulse width modulator ("PWM") outputs via module 416. Processor 400 can program plural outputs. Timer module 411 is provided for monitoring and controlling various timers for various switch operations.

System 307 also includes two frame manager modules 402 and 403 that are similar in structure. Processor 400 can access runtime code from memory 420 and input/output instructions from read only memory 409.

Module 402 (also referred to as the "diag module 402") is a diagnostic module used to transfer diagnostic information between a FC-AL and the firmware of system 307.

Diag module 402 is functionally coupled to storage media (via ports 405) via dedicated paths outside switch matrix 408 so that its connection does not disrupt the overall loop. Diag module 402 is used for AL_PA capture during LIP propagation, drive(s) (coupled to ports 405) diagnostics and frame capture.

Module 403 (also referred to as "SES module 403") complies with the SES standard and is functionally coupled to host port 404 and its output is routed through switch matrix 408. SES module 403 is used for in-band management services using the standard SES protocol.

When not bypassed, modules 402 and 403 receive primitives, primitive sequences, and frames. Based on the received traffic and the requests from firmware, modules 402 and 403 maintain loop port state machine (LPSM) (615, FIG. 6B) in the correct state per the FC-AL standard specification, and also maintain the current fill word.

Based on a current LPSM 615 state (OPEN or OPENED State), modules 402 and 403 receive frames, pass the frame onto a buffer, and alert firmware that a frame has been received. Module 402 and 403 follow FC-AL buffer to buffer credit requirements.

Firmware may request modules 402 and 403 to automatically append SOF and EOF to the outgoing frame, and to automatically calculate the outgoing frame's CRC using CRC generator 612. Modules 402 and 403 can receive any class of frames and firmware may request to send either fibre channel Class 2 or Class 3 frames.

Figure 5A:
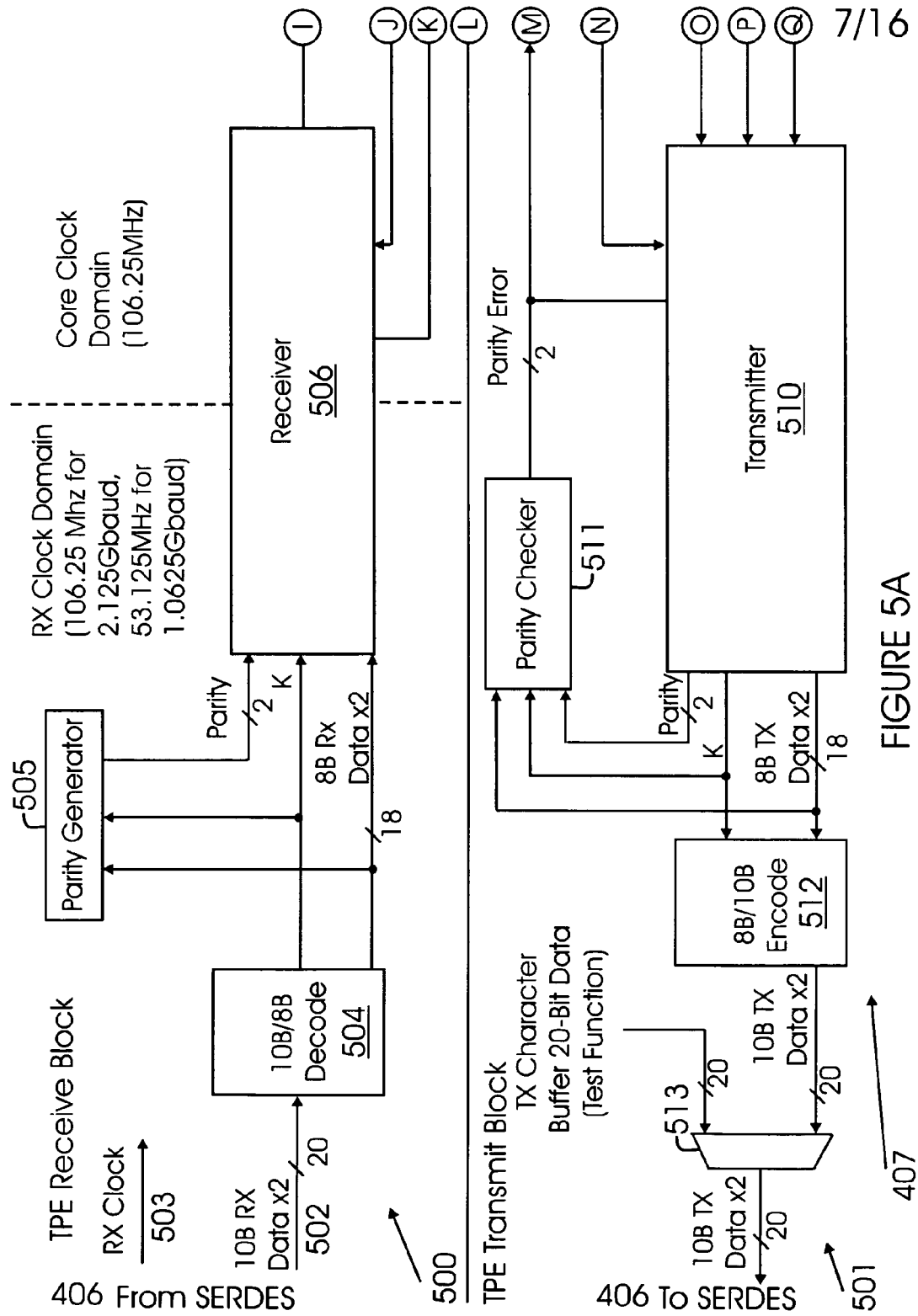
FIGS. 5A and 5B (jointly referred to as FIG. 5) show a block diagram of a transmission protocol engine, according to one aspect of the present invention.
Figure 5B:
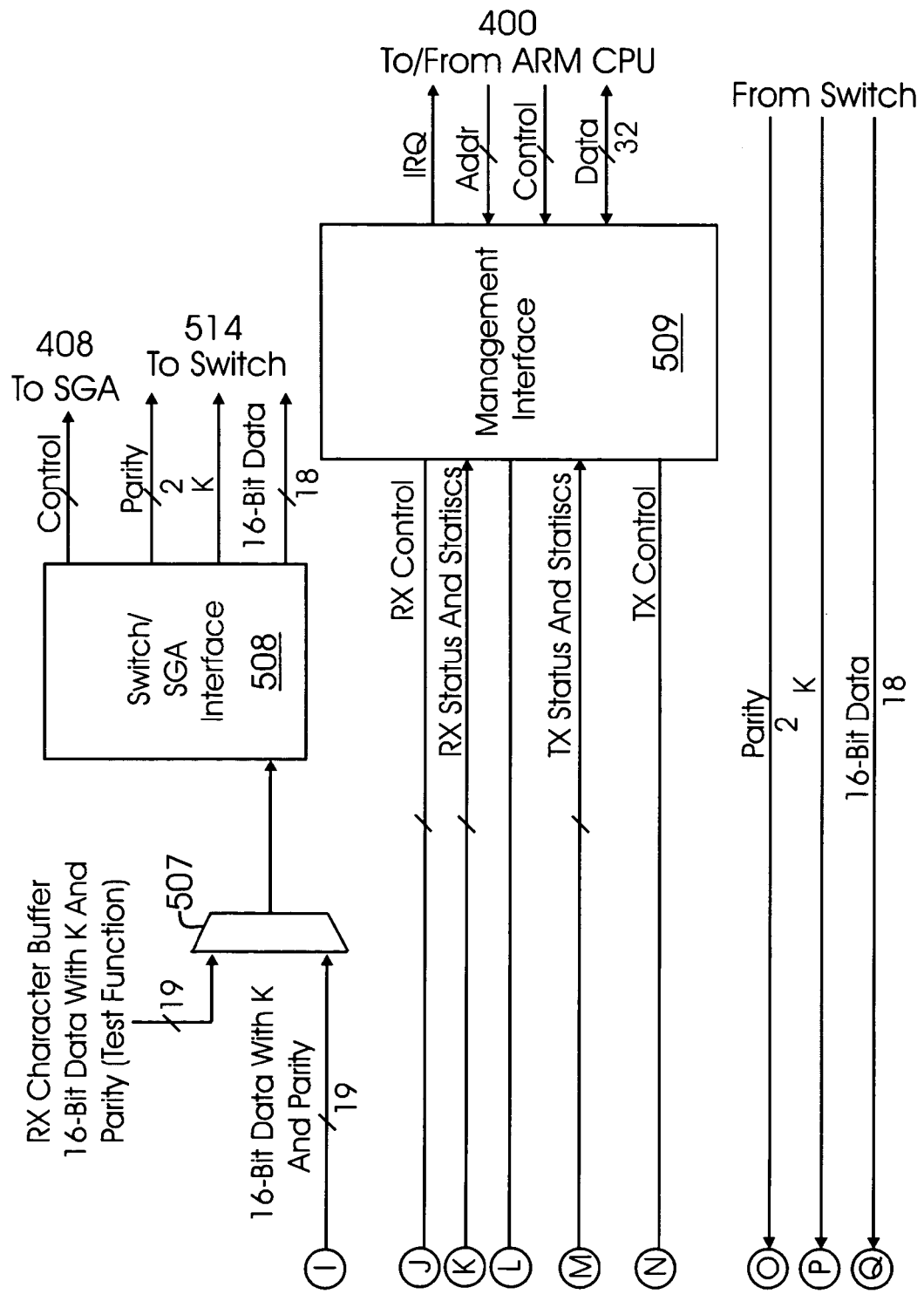

Port Management Interface (PMIF) 401 allows processor 400 access to various port level registers, SerDes modules 406 and TPE Management Interfaces 509 (FIG. 5). PMIF 401 contains a set of global control and status registers, receive and transmit test buffers, and three Serial Control Interface (SCIF) controllers (not shown) for accessing SerDes 406 registers.

Figure 6A:
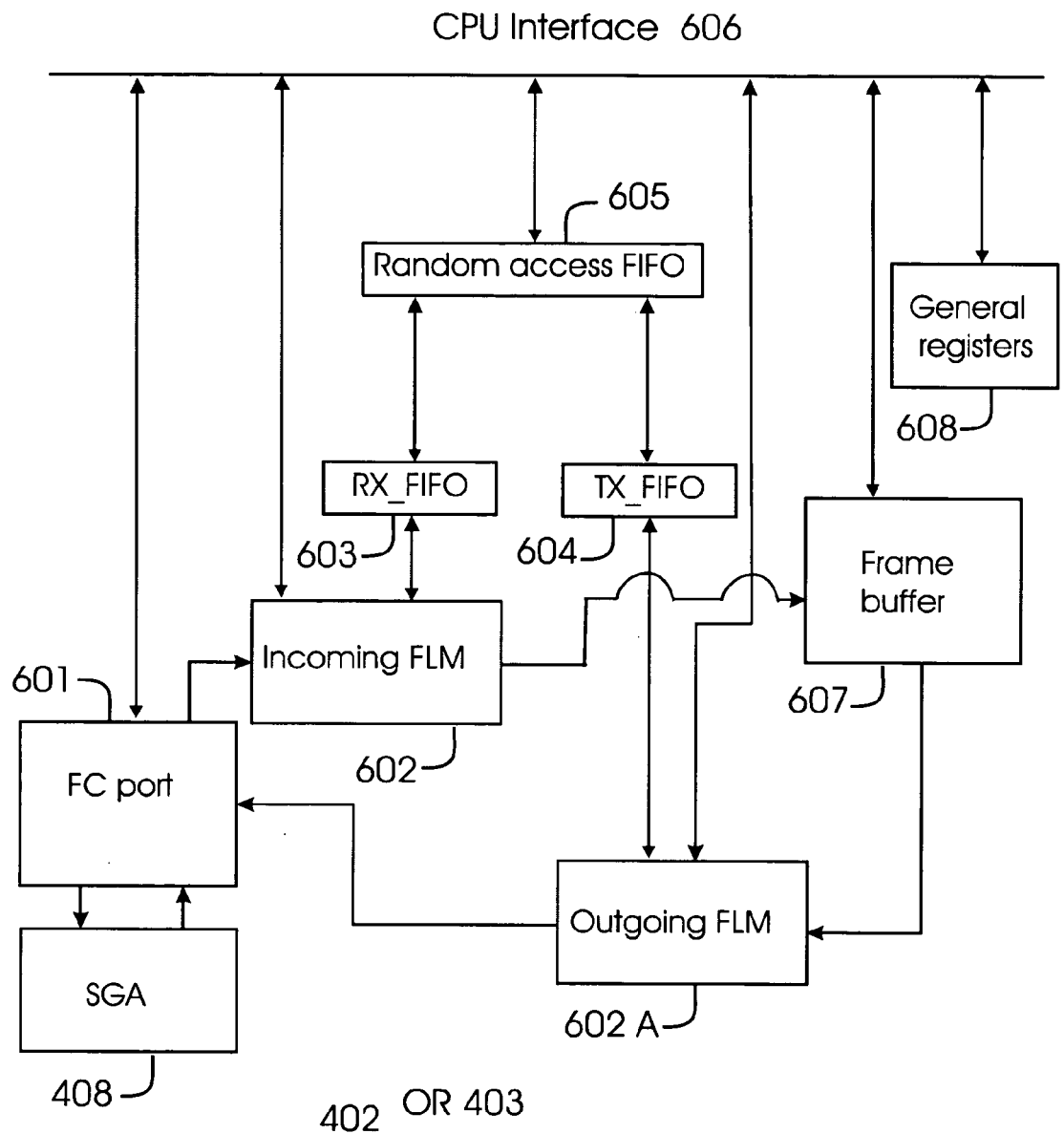
FIGS. 6A and 6B show block diagrams for a diagnostic module and a SES module, according to one aspect of the present invention.
Figure 6B:
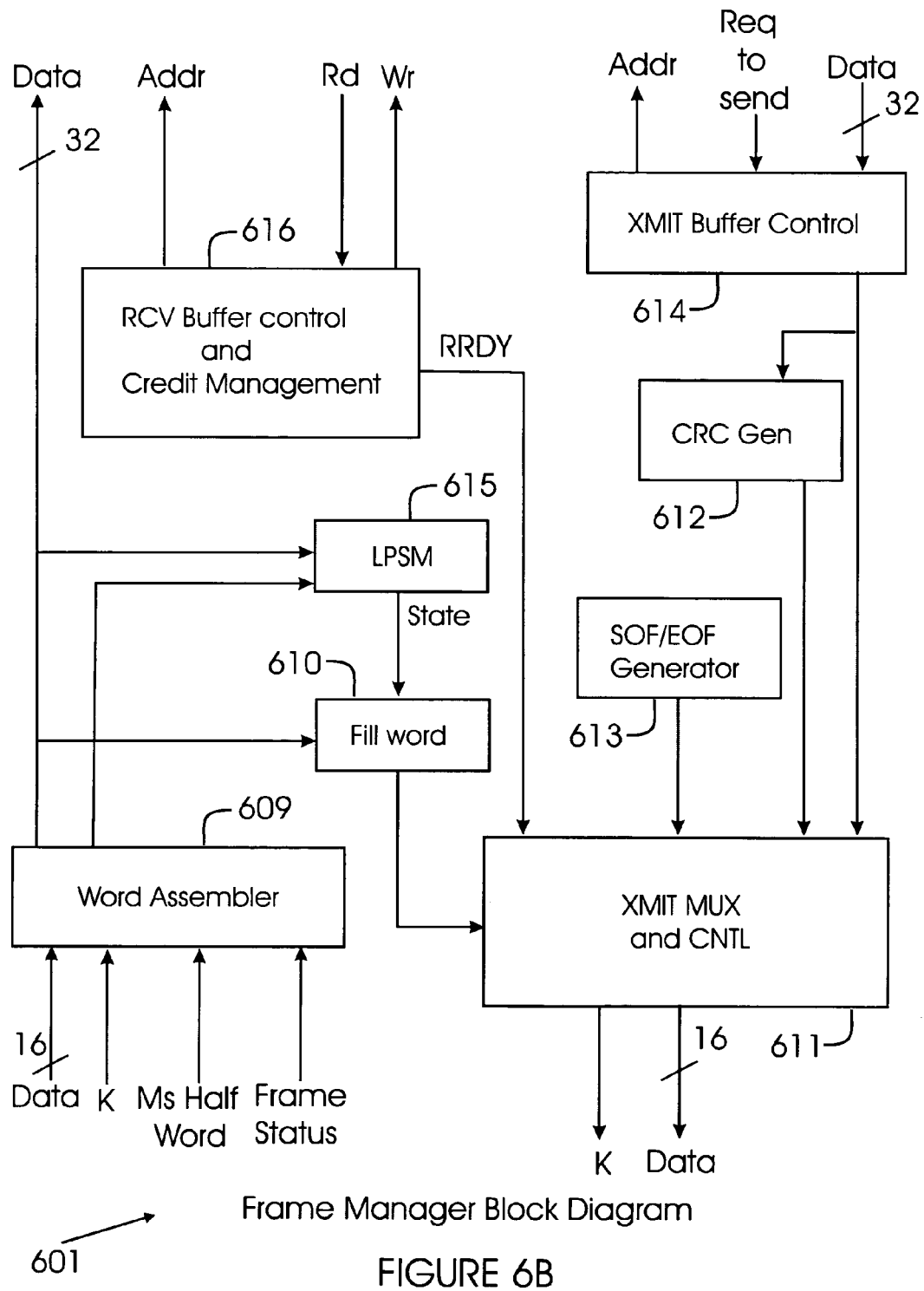

FIGS. 6A and 6B show block diagrams for module 402 and 403. It is noteworthy that the structure in FIGS. 6A and 6B can be used for both modules 402 and 403. FIG. 6B is the internal data path of a FC port 601 coupled to modules 402/403.

Modules 402 and 403 interface with processor 400 via an interface 606. Incoming frames to modules 402 and 403 are received from port 601 (which could be any of the ports 404, 404A and 405) and stored in frame buffer 607. Outgoing frames are also stored in frame buffer 607. Modules 402 and 403 have a receive side memory buffer based on "first-in, first-out" principle, ("FIFO") RX_FIFO 603 and transmit side FIFO TX_FIFO 604 interfacing with a Random access FIFO 605. A receive side FIFO 603 signals to firmware when incoming frame(s) are received. A transmit side FIFO 604 signals to hardware when outgoing frames(s) are ready for transmission. A frame buffer 607 is used to stage outgoing frames and to store incoming frames. Modules 602 and 602A are used to manage frame traffic from port 601 to buffers 603 and 604, respectively.

Modules 402 and 403 use various general-purpose registers 608 for managing control, status and timing information.

Based on the AL_PA, modules 402 and 403 monitor received frames and if a frame is received for a particular module (402 or 403), it will pass the frame onto a receive buffer and alert the firmware that a frame has been received via a receive side FIFO 603. Modules 402 and 403 follow the FC-AL buffer-to-buffer credit requirements using module 616. Modules 402 and 403 transmit primitives and frames based on FC-AL rules. Firmware pre-sends the SOF and then appends the cyclic redundancy code ("CRC") generated by module 612, and the EOF generated by Module 613.

Overall transmission control is performed by module 611 that receives data, SOF, EOF and CRC. A word assembler module 609 is used to assemble incoming words, and a fill word module 610 receives data "words" before sending it to module 611 for transmission. Transmit Buffer control is performed by module 614.

FIG. 5 shows a block diagram of the transmission protocol engine ("TPE") 407. TPE 407 maintains plural counters/registers to interact with drives coupled to ports 405. Each TPE 407 interacts with processor 400 via port manager interface 401.

Each Fibre Channel port of system 400A includes a TPE module for interfacing with SerDes 406. TPE 407 handles most of the FC-1 layer (transmission protocol) functions, including 10B receive character alignment, 8B/10B encode/decode, 32-bit receive word synchronization, and elasticity buffer management for word re-timing and TX/RX frequency compensation.

SerDes modules 406 handle the FC-1 serialization and de-serialization functions. Each SerDes 406 port consists of an independent transmit and receive node.

TPE 407 has a receive module 500 (that operates in the Rx clock domain 503) and a transmit module 501. Data 502 is received from SERDES 406 and decoded by decoding module 504. A parity generator module 505 generates parity data. SGA interface 508 allows TPE to communicate with switch 514 or switch matrix 408. Interface 508 (via multiplexer 507) receives information from a receiver module 506 that receives decoded data from decode module 504 and parity data from module 505.

Management interfaces module 509 interfaces with processor 400. Transmit module 501 includes a parity checker 511, a transmitter 510 and an encoder 512 that encodes 8-bit data into 10-bit data. 10-bit transmit data is sent to SERDES 406 via multiplexer 513.

Port Management Interface (PMIF) 401 allows processor 400 access to various port level registers, SerDes modules 406 and TPE Management Interfaces 509 (MIFs). PMIF 401 contains a set of global control and status registers, receive and transmit test buffers, and three Serial Control Interface (SCIF) controllers (not shown) for accessing SerDes 406 registers.

Figure 6D:
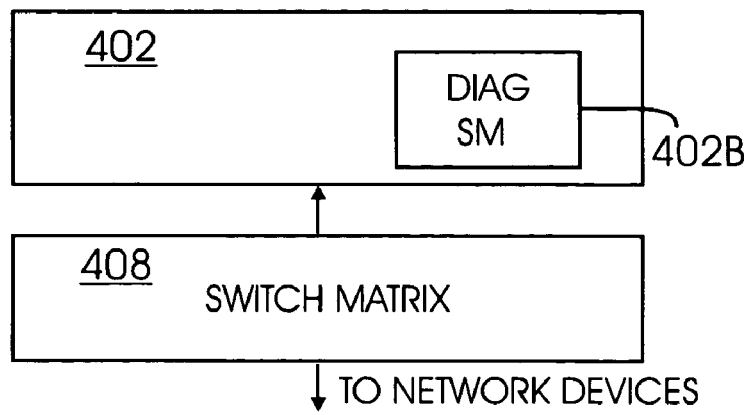
FIGS. 6C-6I show various block diagrams used to reduce disruption in common access networks, according to one aspect of the present invention.
Figure 6C:
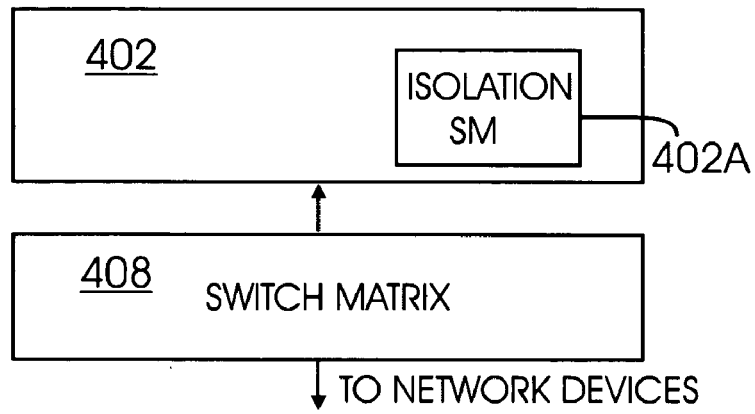
Figure 6E:
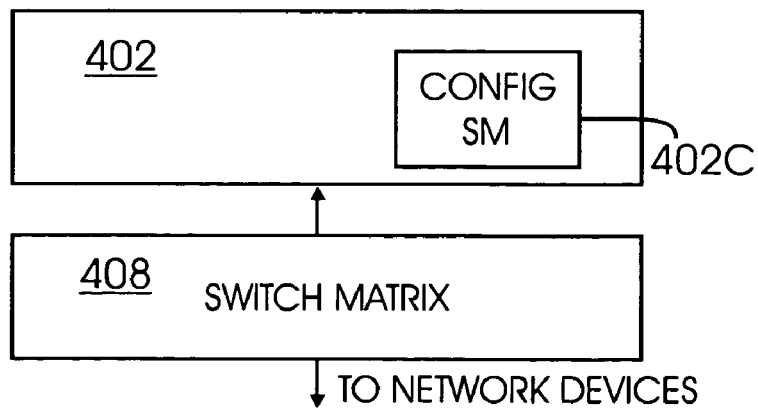

In one aspect of the present invention, module 402/403 includes an Isolation State Machine to prevent disruptive behaviors. FIG. 6C shows an example of an Isolation State Machine ("ISM") 402A, which isolates disruptive device, as illustrated in FIG. 6I. ISM 402A can also function in a diagnostic mode as a diagnostic state machine (402B, FIGS. 6D and 6J (diagnostic state machine as 402D, used interchangeably), and as a configuration state machine 402C (FIGS. 6E and 6K).

Figure 6F:
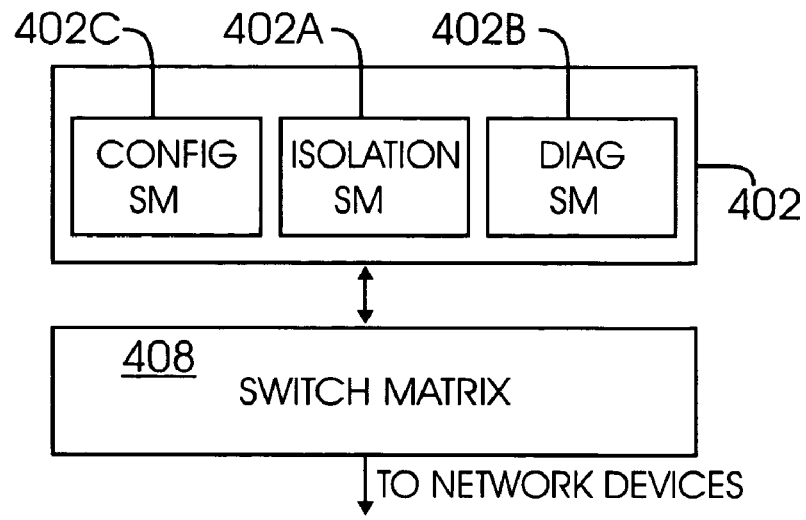

FIG. 6F shows ISM 402A, diagnostic ("diag") state machine 402B and configuration state machine 402C as separate components. It is noteworthy that the functionality of the foregoing state machines may all be included in one state machine.

If a network device is disruptive, diag module 402 connects the device to Isolation State Machine 402A to prevent disruptions to the other devices (FIG. 6I), and may opt to perform diagnostics on the suspected device.

If the system can determine the cause and correct the fault, the system may correct the problem and move the corrected network device back to the operating network. The faulty device would stay in-place during this process of isolation, diagnosis and correction.

FIG. 6I shows ISM 402A isolating device 616, while FIG. 6J shows diag state machine 402D diagnosing device 616.

FIG. 6K shows a configuration state machine 402C interacting with a device 616 that needs to be set-up.

Figure 7:
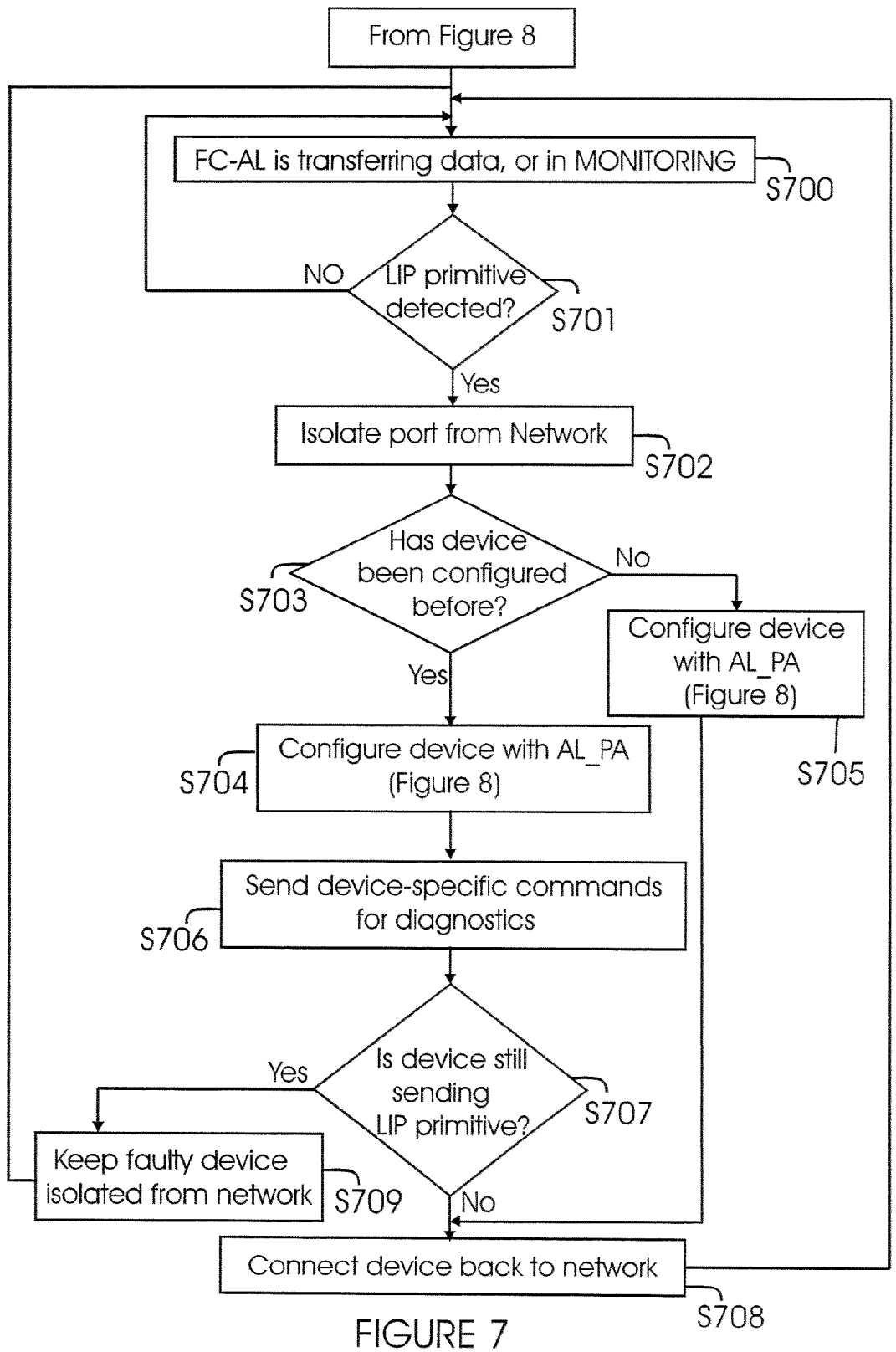
FIG. 7 shows process flow diagram for assigning an AL_PA to a device without disrupting all other devices, according to one aspect of the present invention

FIG. 7 shows process steps of how to assign an AL_PA to a device without disrupting all other devices, according to one aspect of the present invention. In step S700, the process is either transferring data or is monitoring the network.

In step S701, the process determines if a LIP is received. If a LIP is received, then in step S702, ISM 402A isolates the port (via TPE 407). If not, the process goes back to step S700.

In step S703, the process determines if the device (for example, 616) has been configured before. If the device is not configured, then the device (616) is configured in step S705 (as described below with respect to FIG. 8). If the device (616) has been configured before, the device is still configured (in step S704, as described below with respect to FIG. 8), followed by additional diagnostics using device-specific commands in step S706.

In step S707, the process determines if the device (for example, 616) is still sending LIPs. If yes, the device is isolated from the network in step S709. If the device is not sending LIPs, then it is connected to the network in step S708.

In certain networks, device configuration and initialization is disruptive to all network devices. For instance, when a FC-AL device initializes, it normally needs to acquire an AL_PA. This process of acquiring an AL_PA is disruptive and requires all network devices to stop any on-going data transfer until the AL_PA assignment has completed and then restart the previous data transfers.

Module 402/403 prevents device-configuration disruptions on an operational network, even when new devices are inserted. In addition, the present invention would also prevent disruptions when a faulty device is disconnected from the system, and a replacement device is connected in the place of the faulty device. In such a case, Configuration State Machine 402C can isolate the replacement device and configure the device identically to that of the replaced device.

As an example, suppose a FC-AL device is initializing and thus sends LIP primitives in order to acquire an AL_PA. To prevent disruption, the system would isolate the device and assign an AL_PA to the device as discussed below with respect to FIG. 8 process steps.

Figure 8:
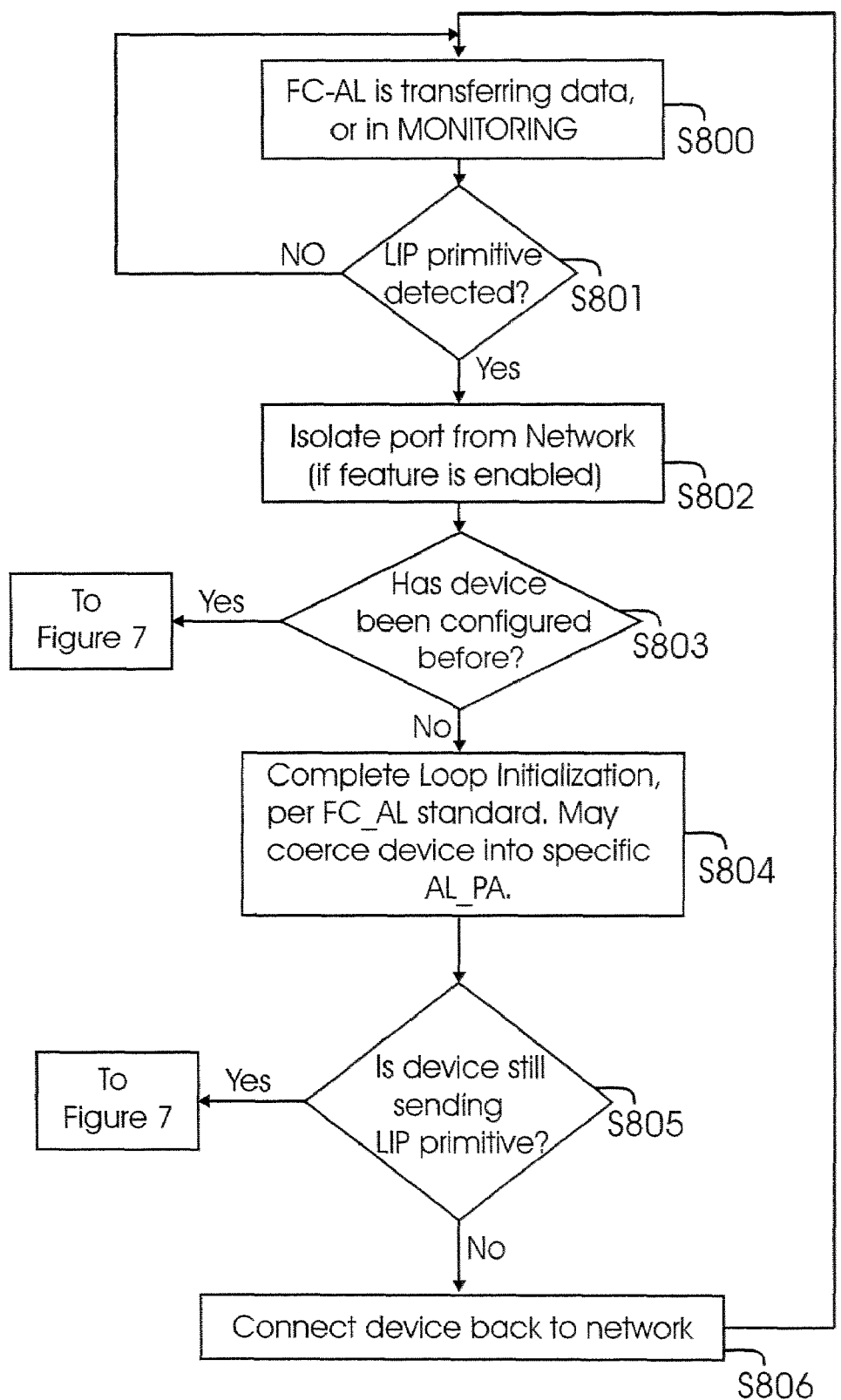
FIG. 8 shows a process flow diagram for isolating a disruptive device and assigning an AL_PA to the device, according to one aspect of the present invention.

Turning in detail to FIG. 8, in step S800, the process is either transferring data or is monitoring the network. If a LIP is detected in step S801, the process isolates the port in step S802. In step S803, the process determines if the device has been configured. If yes, then the process goes to FIG. 7. If not, then in step S804 the device is configured per FC-AL standard.

In step S805, the process determines if the device is still sending LIPs. If yes, then the process goes to FIG. 7, otherwise the device is connected back to the network in step S806.

Figure 6G:
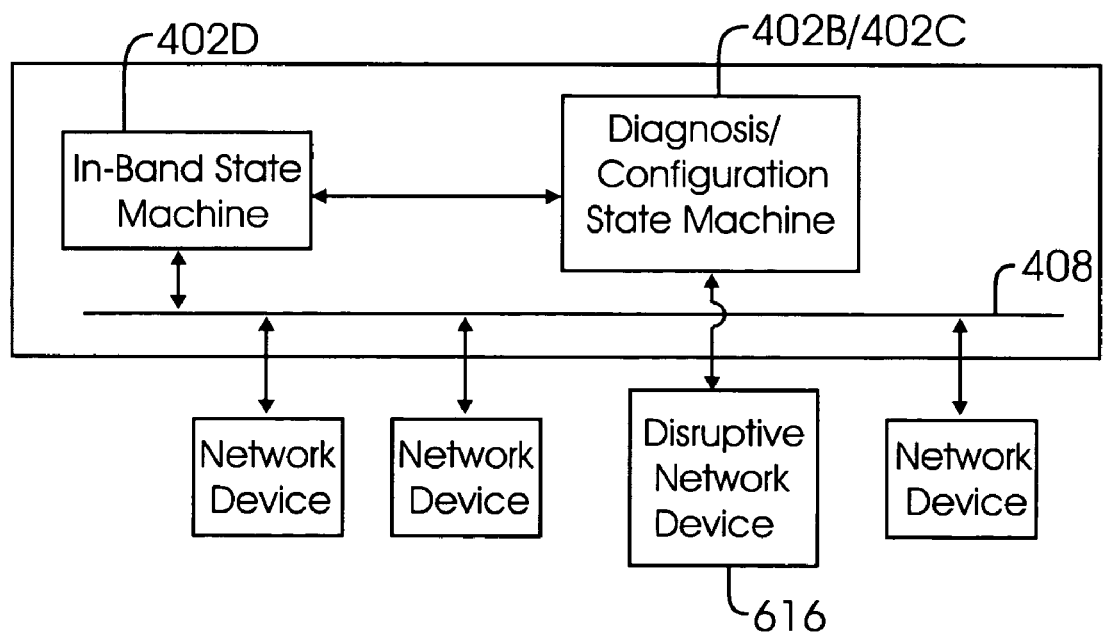
Figure 6H:
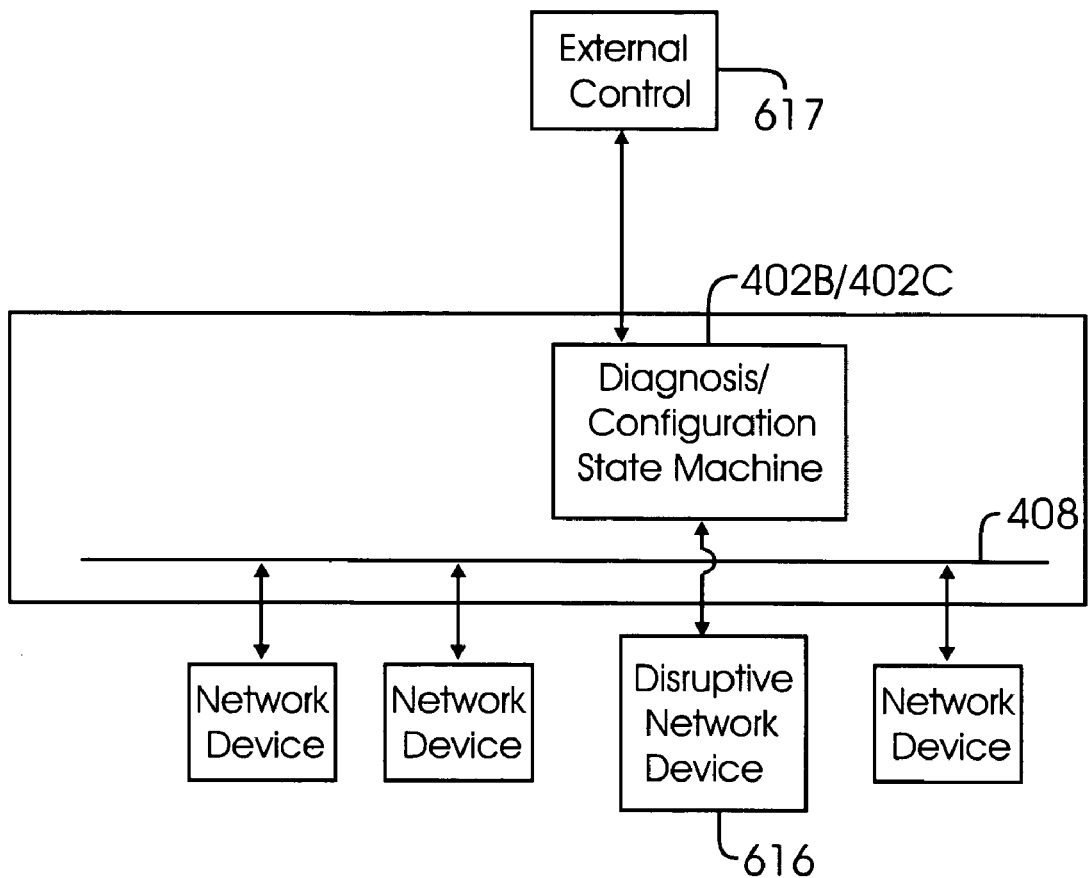
Figure 6:
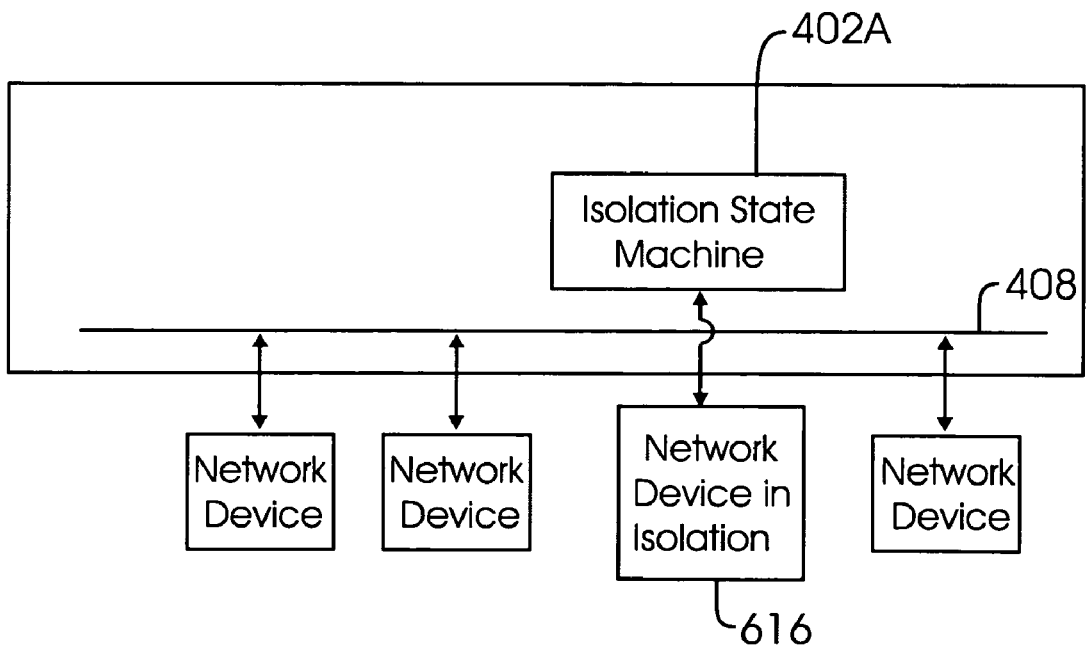
Figure 6:
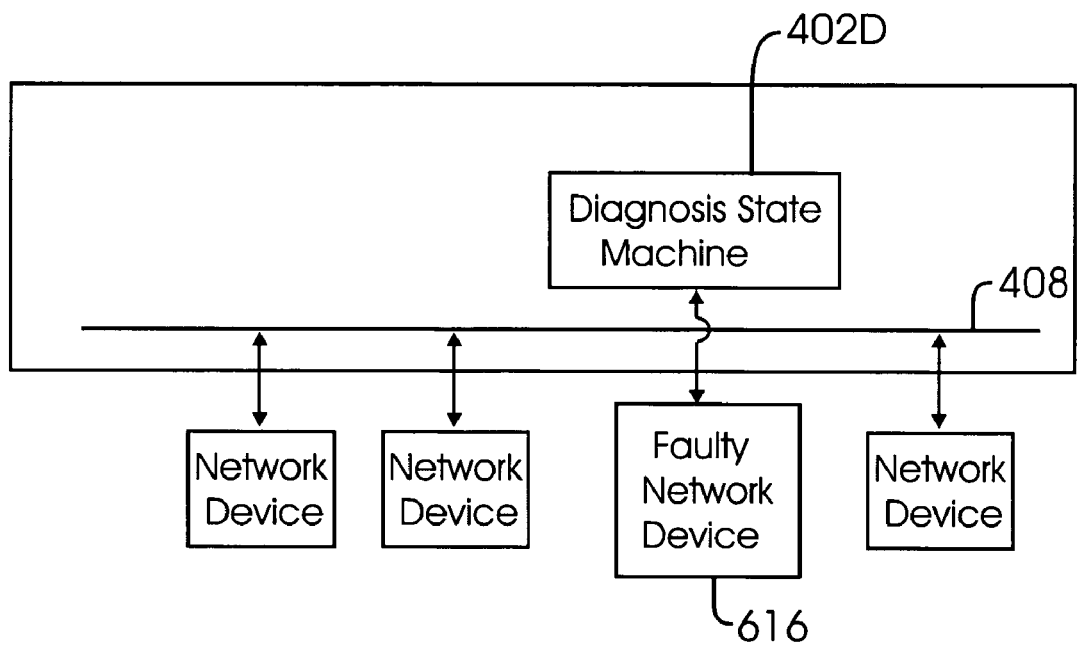
Figure 6:
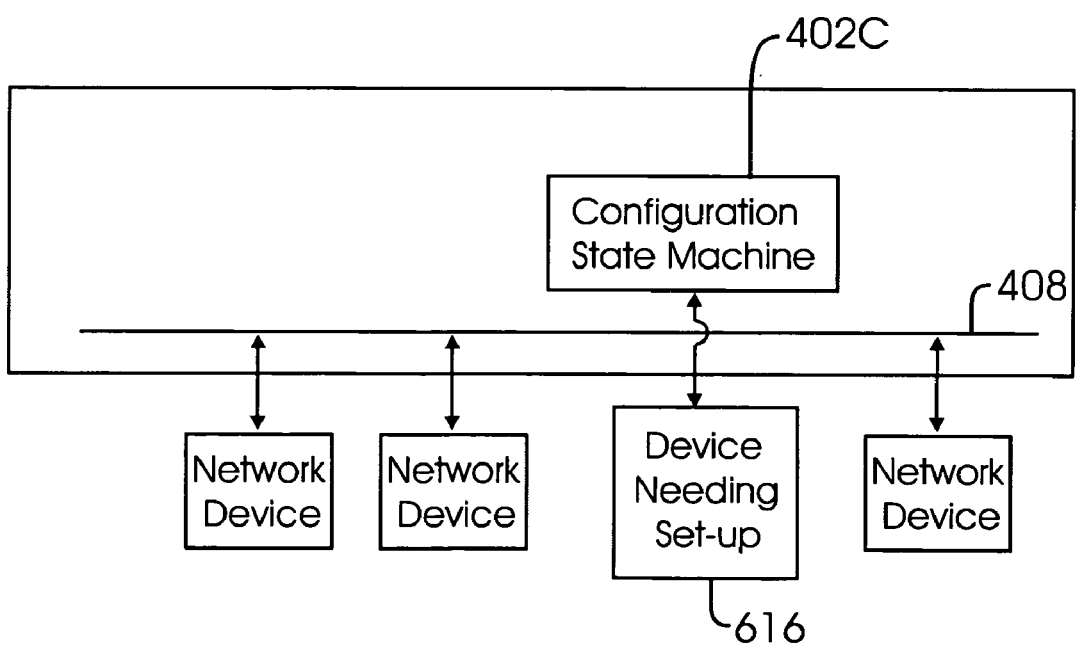

Diagnostics and device configuration need not be restricted to knowledge contained in system 307 or module 402/403. FIG. 6H shows an external control means 617 that can be used for acquiring data to/from Isolation State Machine 402A (i.e. Diagnosis/Configuration State Machine), for example UART 418 or GPIO 415 may be used for external control 617.

Control and diagnostic information may also be shared with an in-band state machine 402D (FIG. 6G) located within module 403, in one aspect of the present invention.

Although the present invention has been described with reference to specific embodiments, these embodiments are illustrative only and not limiting. Many other applications and embodiments of the present invention will be apparent in light of this disclosure and the following claims.

What is claimed is:

1. A method for isolating a defective device in a fibre channel arbitrated loop network, configuring the defective device and re-connecting the configured device back to the network, the method comprising:
   detecting a loop initialization primitive (LIP) from a device coupled to the arbitrated loop, the LIP indicating that the device is defective;
   isolating a port to which the defective device is connected;
   configuring the isolated device and acquiring an arbitrated loop physical address (AL_PA) for the isolated device;
   determining if the configured device is sending LIPs; and
   maintaining isolation of the configured device if the device continues to send LIPs.

2. The method of claim 1, further comprising:
   reconnecting the configured device to the network if the device stops sending LIPs.

3. The method of claim 1, wherein other devices connected to the arbitrated loop are not disrupted after the isolated device is isolated.

4. A fibre channel switch element configured to connect a plurality of devices in a network, the switch element comprising:
   a port having a diagnostic module including an isolation state machine that allows the switch element to isolate a device disrupting other devices in the network;
   wherein, when a loop initialization primitive (LIP) is detected from a first one of the devices, the isolation state machine is configured to isolate the first device, and to configure the first device while it is isolated from the network so that the configuration process does not disrupt other devices in the network, the configuration process including acquiring an arbitrated loop physical address (AL_PA) for the first device.

5. The switch element of claim 4, wherein the state machine may configure the first device after detecting disruptive parameters from the first device.

6. The switch element of claim 4, wherein the state machine is configured to perform diagnostic operations on the first device.

7. The switch element of claim 5, wherein disruptive parameters include propagating loop initialization primitives.

8. A network for connecting devices, comprising:
   a fibre channel switch element including a diagnostic module having an isolation state machine, wherein, when a loop initialization primitive (LIP) is detected from a first one of the devices, the isolation state machine is configured to isolate a the first device, and to configure the first device while it is isolated from the network so that the configuration process does not disrupt other devices in the network, the configuration process including acquiring an arbitrated loop physical address ($AL_{13}$ PA) for the first device.

9. The network of claim 8, wherein the state machine may configure the first device after detecting disruptive parameters from the first device.

10. The network of claim 8, wherein the state machine is configured to perform diagnostic operations on the first device.

11. The network of claim 9, wherein disruptive parameters include propagating loop initialization primitives.

12. The method of claim 2, wherein the configured device is reconnected to the network without disrupting other devices connected to the arbitrated loop.

13. The method of claim 1, further comprising the steps of removing the isolated device from the network and replacing it with a new device.

* * * * *

UNITED STATES PATENT AND TRADEMARK OFFICE
CERTIFICATE OF CORRECTION

PATENT NO. : 7,355,966 B2
APPLICATION NO. : 10/889337
DATED : April 8, 2008
INVENTOR(S) : John M Fike et al.

It is certified that error appears in the above-identified patent and that said Letters Patent is hereby corrected as shown below:

On the title page, item [56]:

On page 3, in column 2, under "Other Publications", line 23, delete "Opertion" and insert -- Operation --, therefor.

On page 3, in column 2, under "Other Publications", line 64, delete "Appartus" and insert -- Apparatus --, therefor.

On page 4, in column 2, under "Other Publications", line 9, delete "2005" and insert -- 2006 --, therefor.

In column 6, line 18, delete "12C (12C" and insert -- I2C (I2C --, therefor.

In column 10, line 47, in claim 8, delete "($AL_{13}$ PA)" and insert -- (AL_PA) --, therefor.

Signed and Sealed this

Second Day of November, 2010

David J. Kappos
*Director of the United States Patent and Trademark Office*